(12) United States Patent
Hay

(10) Patent No.: US 10,145,215 B2
(45) Date of Patent: Dec. 4, 2018

(54) DRILL BIT WITH ELECTRICAL POWER GENERATOR

(71) Applicant: Halliburton Energy Services, Inc., Houston, TX (US)

(72) Inventor: Richard Thomas Hay, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 239 days.

(21) Appl. No.: 15/119,911

(22) PCT Filed: Dec. 31, 2014

(86) PCT No.: PCT/US2014/072984
§ 371 (c)(1),
(2) Date: Aug. 18, 2016

(87) PCT Pub. No.: WO2016/108882
PCT Pub. Date: Jul. 7, 2016

(65) Prior Publication Data
US 2017/0051579 A1 Feb. 23, 2017

(51) Int. Cl.
*E21B 41/00* (2006.01)
*E21B 10/08* (2006.01)
(Continued)

(52) U.S. Cl.
CPC .......... *E21B 41/0085* (2013.01); *E21B 10/08* (2013.01); *E21B 12/00* (2013.01); *E21B 17/042* (2013.01); *E21B 41/00* (2013.01); *E21B 45/00* (2013.01); *E21B 47/06* (2013.01); *E21B 47/065* (2013.01); *E21B 47/12* (2013.01); *H02K 1/17* (2013.01); *H02K 1/27* (2013.01)

(58) Field of Classification Search
CPC ........ E21B 10/08; E21B 12/00; E21B 17/042; E21B 41/00; E21B 41/0085; E21B 45/00; E21B 47/06; E21B 47/065; E21B 47/12
See application file for complete search history.

(56) References Cited

U.S. PATENT DOCUMENTS 4,889,195 A 12/1989 Kruger et al.
5,439,068 A 8/1995 Huffstutler et al.
(Continued)

FOREIGN PATENT DOCUMENTS

EP 0352961 B1 1/1990
WO 1982002984 A1 9/1982

OTHER PUBLICATIONS

International Search Report and Written Opinion for PCT/US2014/072984 dated Sep. 7, 2015.

*Primary Examiner* — Caroline N Butcher
(74) *Attorney, Agent, or Firm* — Gilliam IP PLLC

(57) ABSTRACT

An example drill bit includes a bit body defining at least one pocket, and a support arm attachable to the bit body at the at least one pocket and including a coupling that extends from the support arm. A roller cone defines a cavity for receiving the coupling to rotatably mount the roller cone on the coupling. A direct drive electrical power generator is positioned within the coupling and is operatively coupled to the roller cone such that rotation of the roller cone correspondingly rotates a portion of the direct drive electrical power generator to generate electrical power.

22 Claims, 10 Drawing Sheets

(51) Int. Cl.
  *E21B 12/00*   (2006.01)
  *E21B 17/042*  (2006.01)
  *E21B 45/00*   (2006.01)
  *E21B 47/06*   (2012.01)
  *E21B 47/12*   (2012.01)
  *H02K 1/17*    (2006.01)
  *H02K 1/27*    (2006.01)

(56) References Cited

U.S. PATENT DOCUMENTS

| | | |
|---|---|---|
| 5,965,964 A | 10/1999 | Skinner et al. |
| 6,672,409 B1 | 1/2004 | Dock et al. |
| 7,190,084 B2 | 3/2007 | Hall et al. |
| 7,337,858 B2 | 3/2008 | Hall et al. |
| 7,982,351 B2 | 7/2011 | Atallah et al. |
| 8,044,527 B2 | 10/2011 | Mari et al. |
| 8,358,044 B2 | 1/2013 | Waszak et al. |
| 8,466,592 B2 | 6/2013 | Atallah et al. |
| 8,528,661 B2 | 9/2013 | Patel et al. |
| 2005/0230974 A1 | 10/2005 | Masters et al. |
| 2006/0113803 A1 | 6/2006 | Hall et al. |
| 2008/0267785 A1 | 10/2008 | Cervenka et al. |
| 2011/0017514 A1 | 1/2011 | Anderele |
| 2011/0042965 A1 | 2/2011 | Atallah et al. |
| 2012/0103690 A1 * | 5/2012 | Patel ............ E21B 10/08 175/57 |
| 2012/0228954 A1 | 9/2012 | Kesler et al. |
| 2013/0033130 A1 | 2/2013 | Nair et al. |
| 2013/0328442 A1 | 12/2013 | Hay et al. |
| 2014/0102790 A1 | 4/2014 | Lee |
| 2014/0284932 A1 | 9/2014 | Sharkh et al. |
| 2014/0328668 A1 | 11/2014 | Anthony |
| 2015/0018168 A1 | 1/2015 | Davey et al. |

* cited by examiner

DRILL BIT WITH ELECTRICAL POWER GENERATOR

BACKGROUND

The present disclosure is related to downhole power generation systems and, more particularly, to drill bit including devices that generate electrical power.

A wide variety of downhole well tools that require electrical power for operation are used during exploration and production of subterranean hydrocarbons. For example, flow control devices, sensors, samplers, packers, instrumentation within well tools, telemetry devices, and well logging devices are each regularly used and require electricity in performing their respective functions. One common method of supplying electrical power to downhole well tools is to use batteries that can be disposed within the downhole well tools. Unfortunately, some batteries cannot operate for an extended period of time at downhole temperatures, and those batteries that are able to operate in downhole temperatures must still be replaced periodically.

Another common method of supplying electrical power to downhole well tools is extending one or more electrical lines from the surface to the downhole well tools. Electrical lines that extend for long distances downhole, however, can interfere with flow or access if they are positioned within a tubing string, and they can be damaged during run-in if they are positioned outside of the tubing string or cumbersome to deal with when moving pipe in an out of the hole. In addition, rotating such drill strings can result in the need for slip rings to jump the power from a non-rotating part of the drilling system to a rotating part. Such slip rings are often unreliable. Yet another common method to supply power down hole is through the use of a turbine-powered generator positioned in the mud flow, where drilling fluid passes through the turbine, which spins a generator shaft to produce power.

Recently, sensors and other electricity-consuming devices have been placed directly in drill bits of downhole drilling systems to provide various functions, such as monitoring and reporting data relating to the drill bit, the drilling operation, and the surrounding formation being penetrated by the drill bit. It is often difficult to supply electrical power to such electricity-consuming devices from above the drill bit because of the presence of the mechanical connection between the drill bit and the remaining portions of the drill string. Therefore, batteries are often used to power drill bit-mounted devices. As can be appreciated, the electrical energy provided by batteries is often limited due to their size and capacity.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to downhole power generation systems and, more particularly, to drill bit including devices that generate electrical power.

The embodiments described herein provide an electrical power generator that may be positioned within a cutter cone assembly of a roller cone drill bit. The electrical power generator may comprise a direct drive power generation system configured to generate electrical power as the roller cones of the roller cone drill bit rotate in operation. More particularly, the electrical power generator may include a magnetic flux multiplier assembly that, when properly assembled, may be operatively coupled to a roller cone such that rotation of the roller cone rotates a portion of the magnetic flux multiplier assembly and thereby generates electrical power for consumption. The electrical power generated by the electrical power generator may be conveyed to various electricity-consuming tools or devices within the roller cone drill bit or within a near-bit sub operatively coupled to the roller cone drill bit or any other device positioned above the drill bit where power can be transmitted to that device through a power cable. As opposed to conventional in-the-bit power generation systems, which commonly incorporate a gearing system in generating electrical power, the electrical power generator of the present disclosure uses a direct drive system that bypasses the need for a gearing system, while simultaneously increasing the power efficiency for the available volume of space within the cutter cone assembly. The electrical power generator described herein may be able to provide a greater amount of electrical power through a more efficient electromechanical coupling to a low speed energy source (e.g., the roller cone).

Figure 1:
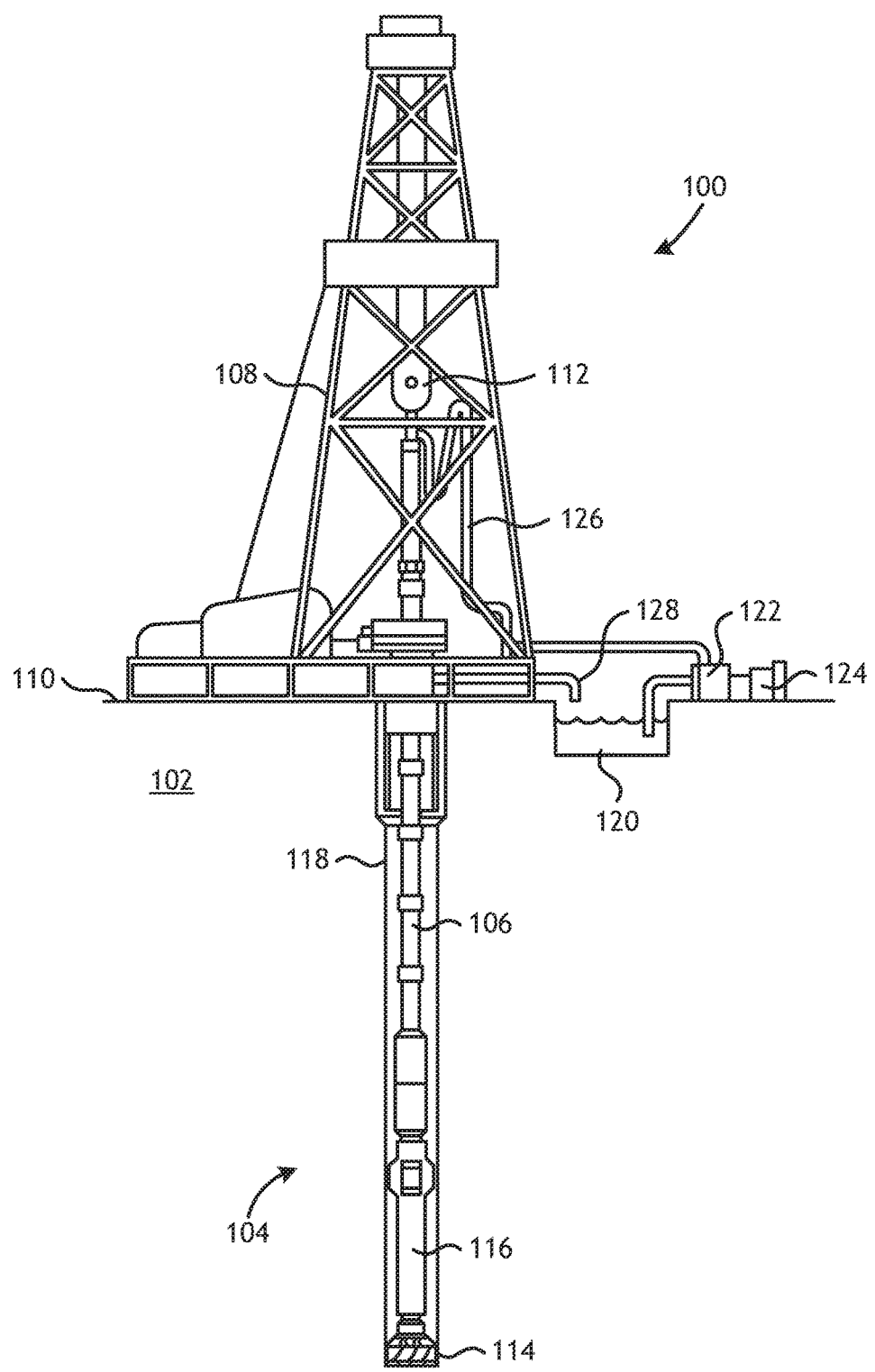
FIG. 1 is a schematic diagram of a drilling system that may employ one or more principles of the present disclosure.

Referring to FIG. 1, illustrated is an exemplary drilling system 100 that may employ one or more principles of the present disclosure. Boreholes may be created by drilling into the earth 102 using the drilling system 100. The drilling system 100 may be configured to drive a bottom hole assembly (BHA) 104 positioned or otherwise arranged at the bottom of a drill string 106 extended into the earth 102 from a derrick 108 arranged at the surface 110. The derrick 108 includes a crane 112 used to lower and raise the drill string 106. The drill string 106 is rotated by a drive key in the rotary table and a mating faceted kelly pipe diameter to the drive key on surface 110. The kelly pipe is integral with the drill string 106 and when the kelly is rotated, it rotates the drill string 106.

The BHA 104 may include a drill bit 114 operatively coupled to a tool string 116 which may be moved axially within a drilled wellbore 118 as attached to the drill string 106. In some instances a mud motor (not shown) such as a positive displacement motor (PDM), a turbine motor (e.g., a turbodrill), or an electric motor can be used to provide the rotational power to the drill bit 114 in addition to or in place of rotation provided from surface 110. During operation, the drill bit 114 penetrates the earth 102 and thereby creates the wellbore 118. The BHA 104 provides directional control of the drill bit 114 as it advances into the earth 102. The tool string 116 can be semi-permanently mounted with various measurement tools (not shown) such as, but not limited to, measurement-while-drilling (MWD) and logging-while-drilling (LWD) tools, that may be configured to take downhole measurements of drilling conditions and earth properties. In other embodiments, the measurement tools may be self-contained within the tool string 116, as shown in FIG. 1.

Fluid or "mud" from a mud tank 120 may be pumped downhole using a mud pump 122 powered by an adjacent power source, such as a prime mover or motor 124. The mud may be pumped from the mud tank 120, through a stand pipe 126, which feeds the mud into the drill string 106 and conveys the same to the drill bit 114. The mud exits one or more nozzles arranged in the drill bit 114 and in the process cools the drill bit 114. After exiting the drill bit 114, the mud circulates back to the surface 110 via the annulus defined between the wellbore 118 and the drill string 106, and in the process, returns drill cuttings and debris to the surface 110. The cuttings and mud mixture are passed through a flow line 128 and are processed such that a cleaned mud is returned down hole through the stand pipe 126 once again.

The downhole motor (i.e., a mud motor, a turbine motor, an electric motor, etc.), if used, is generally positioned within the BHA 104 and often just above the drill bit 114 or a rotary steerable tool and, in some cases, at or near the top of the BHA 104. It is often difficult to run power through such downhole motors from power systems positioned above since there is a rotational difference between the upper and lower end of the assembly, which thereby requires a form of jumping power across two rotationally different bodies. This makes the delivery of power to systems in or near the drill bit 114, but below the downhole motor (if used), much more difficult and less reliable. Further, a power cable would need to be routed through bearings and other mechanisms in the downhole motor making it more costly and difficult. Therefore, a power source is needed that does not require a slip ring or inductor pair to jump power across two rotationally different members in the BHA 104.

Although the drilling system 100 is shown and described with respect to a rotary drill system in FIG. 1, those skilled in the art will readily appreciate that many types of drilling systems can be employed in carrying out embodiments of the disclosure. For instance, drills and drill rigs used in embodiments of the disclosure may be used onshore (as depicted in FIG. 1) or offshore (not shown). Offshore oil rigs that may be used in accordance with embodiments of the disclosure include, for example, floaters, fixed platforms, gravity-based structures, drill ships, semi-submersible platforms, jack-up drilling rigs, tension-leg platforms, and the like. It will be appreciated that embodiments of the disclosure can be applied to rigs ranging anywhere from small in size and portable, to bulky and permanent.

Further, although described herein with respect to oil drilling, various embodiments of the disclosure may be used in many other applications. For example, disclosed methods can be used in drilling for mineral exploration, environmental investigation, natural gas extraction, underground installation, mining operations, water wells, geothermal wells, and the like. Further, embodiments of the disclosure may be used in weight-on-packers assemblies, in running liner hangers, in running completion strings, casing drilling strings, liner drilling strings, pipe in pipe drilling systems, coil tubing drilling systems, etc., without departing from the scope of the disclosure.

Figure 2A:
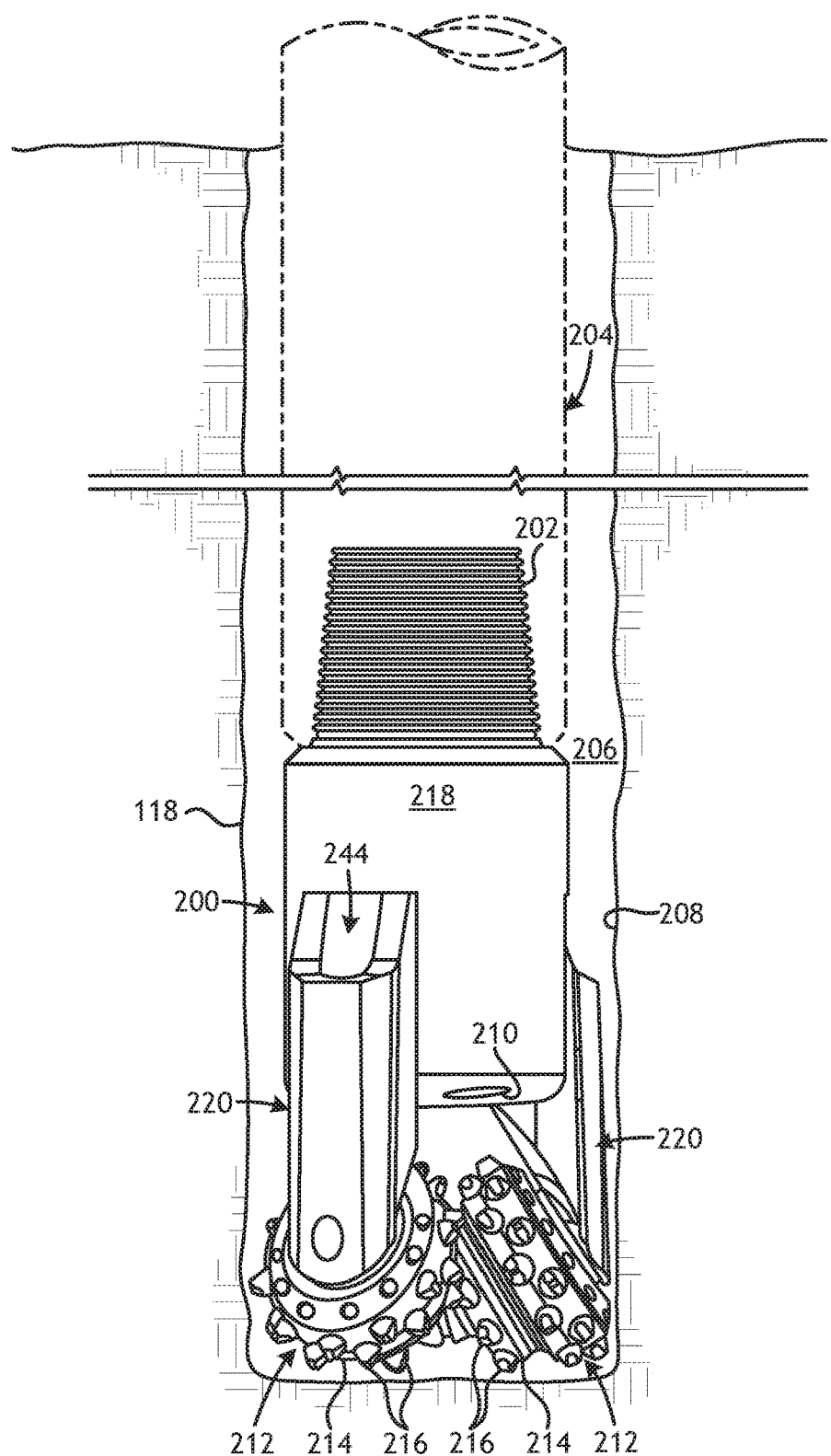
FIGS. 2A and 2B depict side and exploded cross-sectional views, respectively, of a roller cone drill bit that may be used in accordance with the principles of the present disclosure.
Figure 2B:
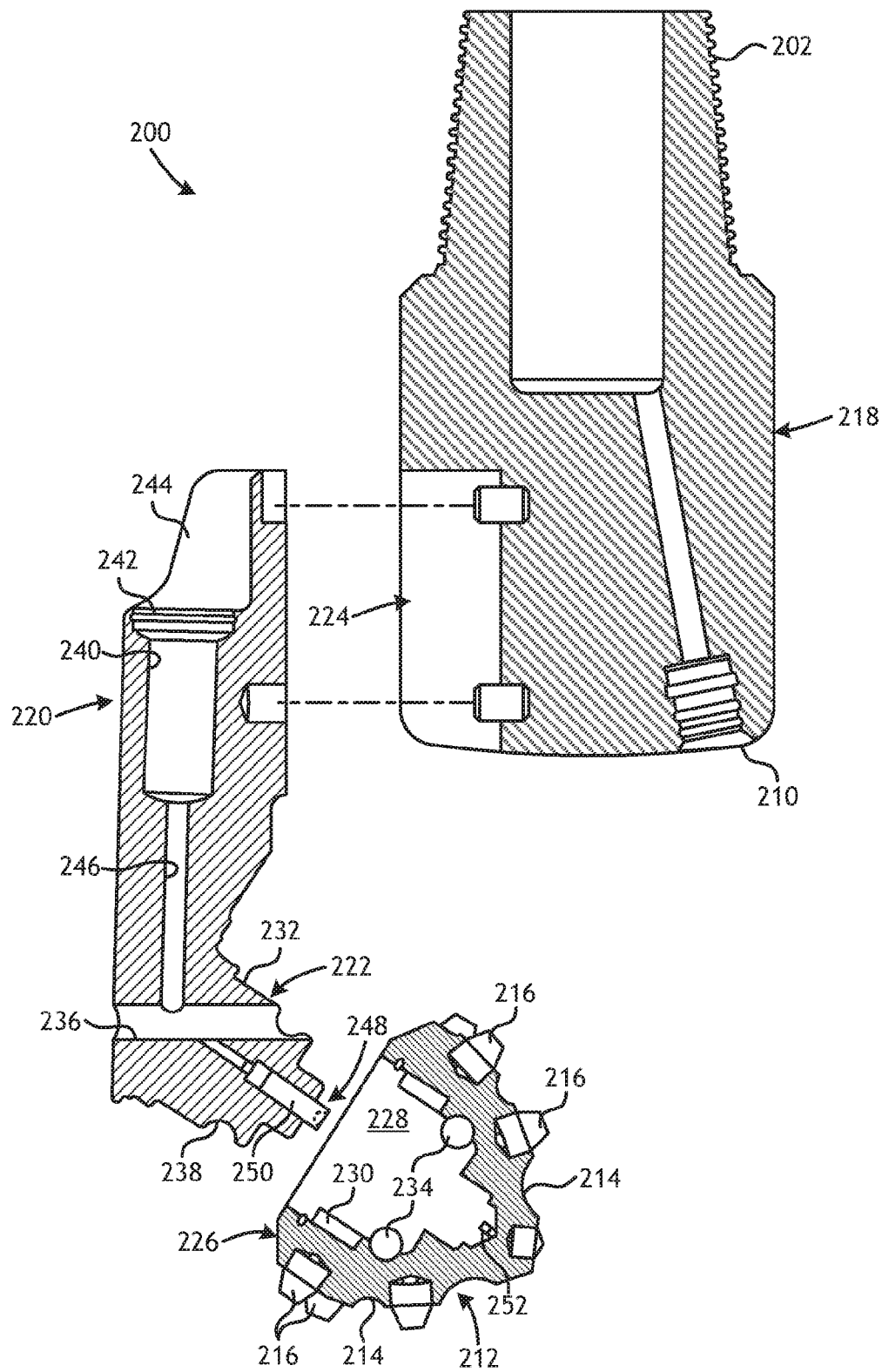

As will be appreciated by those skilled in the art, various types of drill bits may be used to form the wellbore 118. Examples of such drill bits include roller cone bits, also commonly referred to as rotary cone bits. Referring to FIGS. 2A and 2B, with continued reference to FIG. 1, illustrated are views of an exemplary roller cone drill bit 200 that may be used in accordance with the principles of the present disclosure. More particularly, FIG. 2A depicts a side view of the roller cone drill bit 200 (hereafter "the drill bit 200") and FIG. 2B depicts an exploded cross-sectional view of a portion of the drill bit 200. The drill bit 200 may be the same as or similar to the drill bit 114 of FIG. 1 and, therefore, may be used to drill the wellbore 118. As illustrated, the drill bit 200 may include a threaded pin connection 202 for use in attaching the drill bit 200 to a drill string 204. The pin connection 202 and the corresponding threaded connections of the drill string 204 are designed to allow rotation of the drill bit 200 in response to rotation of the drill string 204.

As the drill bit 200 operates, an annulus 206 is formed between the exterior of the drill string 204 and an inner wall 208 of the wellbore 118. In addition to rotating the drill bit 200, the drill string 204 may also be used as a conduit for communicating drilling fluids (not shown) from the well surface to the drill bit 200 at the bottom of the wellbore 118. Such drilling fluids or "mud" may be ejected out of the drill bit 200 via various nozzles 210 provided in the drill bit 200. Cuttings (not shown) formed by the drill bit 200 and any other debris at the bottom of the wellbore 118 will mix with the drilling fluid exiting the nozzles 210 and return to the well surface via the annulus 206. Cutting or drilling action for the drill bit 200 occurs as one or more cutter cone assemblies 212 are rolled around the bottom of the wellbore 118 by rotation of the drill string 204. The cutter cone assemblies 212 cooperate with each other to form the wellbore 118 in response to rotation of the drill bit 200.

Each cutter cone assembly 212 may include cutting edges 214 with protruding inserts 216 configured to scrape and gouge against the sides and bottom of the wellbore 118 in response to the weight and rotation applied to the drill bit 200 from the drill string 204. The position of the cutting edges 214 and the inserts 216 for each cutter cone assembly 212 may be varied to provide the desired downhole cutting action. As will be appreciated, other types of cutter cone assemblies 212 may alternatively be used in accordance with the scope of the present disclosure including, but not limited to, cutter cone assemblies having milled teeth instead of the inserts 216.

The drill bit 200 may include a one-piece or unitary bit body 218 and one or more support arms 220 (typically three) that can be removably attached but are generally permanently welded to the bit body 218. The threaded pin connection 202 may be used to connect the bit body 218 to the BHA 104 (FIG. 1) and may be a pin connection, as shown, or alternatively a female box connection. The bit body 218 may provide or otherwise define one or more pockets 224 (FIG. 2B) spaced radially from each other and configured to receive a corresponding one of the support arms 220 to be secured therein. As will be appreciated by those skilled in the art, there are many different kinds of configurations for securing the support arms 220 to the bit body 218, without departing from the scope of the disclosure. Following a drilling operation, in some embodiments, the support arms 220 may be detached and otherwise removable from the bit body 218 to replace, rebuild or otherwise rehabilitate the drill bit 200. In other embodiments, however, the drill bit 200 is scrapped or discarded and a new drill bit is used.

Referring specifically to FIG. 2B, illustrated is an exploded view showing the relationship between the bit body 218 and one of the support arms 220 with its associated cutter cone assembly 212. Each support arm 220 may include a coupling 222 extending from the respective support arm 220. Each cutter cone assembly 212 of the drill bit 200 is constructed and mounted on its associated coupling 222 in a substantially identical manner, and each support arm 220 is constructed and mounted in its associated pocket 224 in substantially the same manner. Accordingly, only one support arm 220 and cutter cone assembly 212 will be described herein since the same description applies generally to the other support arms 220 and their associated cutter cone assemblies 212.

The cutter cone assembly 212 includes a roller cone 226 that, as illustrated, may exhibit a generally frustoconical shape. The roller cone 226 may provide or otherwise define a cavity 228 configured to receive the coupling 222 such that the roller cone 226 may be mounted on the coupling 222. One or more bearing assemblies 230 may be positioned within the cavity 228 and otherwise configured to interpose the inner walls of the cavity 228 and an annular bearing surface 232 of the coupling 222. As illustrated, the coupling 222 may be angled downwardly and inwardly with respect to the projected axis of rotation of the drill bit 200. This orientation of the coupling 222 results in the roller cone 226 and the associated cutting edges 214 and inserts 216 engaging the side and bottom of the wellbore 118 during drilling operations.

A ball retaining assembly including one or more ball bearings 234 may be used to secure the cutter cone assembly 212 to the coupling 222. More particularly, the roller cone 226 may be retained on the coupling 222 by inserting a plurality of ball bearings 234 through a ball passageway 236 defined through a portion of the support arm 220 and into a ball race 238 defined in the coupling 222. A matching or opposing ball race (not labeled) may be provided on the interior of cutter cone assembly 212. Once inserted, the ball bearings 234, in cooperation with the ball races, will prevent disengagement of the roller cone 226 from the coupling 222. The ball passageway 236 may subsequently be plugged by welding or other known techniques, such as by inserting a ball plug (not shown) in the ball passageway 236.

A lubricant chamber 240 may be provided or otherwise defined within the support arm 220 and may be sealed with a diaphragm 242. An opening 244 to the exterior of the drill bit 200 is defined in the support arm 220 and used to access and provide lubricant to the lubricant chamber 240 via the diaphragm 242. A lubricant conduit 246 may extend from the lubricant chamber 240 to the ball passageway 236 to provide lubrication to the ball bearings 234 disposed within the ball race 238.

As will be appreciated, the drill bit 200 and its foregoing description are merely provided for illustrative purposes in explaining the principles of the present disclosure. Indeed, those skilled in the art will readily recognize that other types and designs of roller cone drill bits and numerous structural variations and different configurations of drill bit 200 may be had, without departing from the scope of the disclosure. Accordingly, the foregoing description of the drill bit 200 should not be considered as limiting the scope of the present disclosure.

According to embodiments of the present disclosure, the drill bit 200 may further include an electrical power generator 248 positioned within the cutter cone assembly 212 and the coupling 222. The electrical power generator 248 may comprise a direct drive power generation system configured to generate electrical power as the drill bit 200 operates in rotation. More particularly, the electrical power generator 248 may include a magnetic flux multiplier assembly 250 that may be secured within the coupling 222. When the cutter cone assembly 212 is properly assembled, the magnetic flux multiplier assembly 250 may be operatively coupled to the roller cone 226 such that rotation of the roller cone 226 rotates a portion of the magnetic flux multiplier assembly 250, such as a rotor shaft (not shown), and thereby generates electrical power for consumption. In some embodiments, the magnetic flux multiplier assembly 250 may be operatively coupled to the roller cone 226 by being directly coupled to an inner wall of the cavity 228. In other embodiments, as illustrated, the magnetic flux multiplier assembly 250 may be operatively coupled to the roller cone 226 via a torque coupling 252. As illustrated, the torque coupling 252 may include a stem that is secured to and extends from the back wall of the cavity 228. The stem of the torque coupling 252 may be configured to matingly engage the end of the magnetic flux multiplier assembly 250 when the roller cone 226 is properly mounted on the coupling 222. In at least one embodiment, the stem of the torque coupling 252 may be splined, but may equally be any other type of coupling that appropriately mates the magnetic flux multiplier assembly 250 with the roller cone 226 for rotation therewith.

As opposed to conventional in-the-bit power generation systems, which commonly incorporate a gearing system in generating electrical power, the electrical power generator 248 of the present disclosure uses a direct drive system that bypasses the need for a gearing system, while simultaneously increasing the power efficiency for the available volume of space within the cutter cone assembly 212. As will be appreciated by those of skill in the art, the input shaft of the magnetic flux multiplier assembly 250 eliminates the need for an outside gear to speed up the rotor shaft, thus leaving more room for power generation capacity in the available volume. However, in some embodiments, a gearing system may alternatively be included to increase the power generator shaft speed, without departing from the scope of the disclosure. In general, however, using that same volume for just direct drive power conversion may be far more efficient than what space would be used to step up the generator shaft speed using a gearing system, since the torque density of the generator volume with a flux multiplier system will generally surpass any torque density gains offered by any known gearing system, including mechanical harmonic gearing and planetary gearing systems.

As will be described in more detail below, the magnetic flux multiplier assembly 250 uses concentric magnetic rings that create harmonic varying flux linkages to increase the overall rate of change of magnetic flux in the armature coil windings. Such systems have the potential to approach power factors of 0.9 or higher (90% efficiency of mechanical to electrical power conversion) at low input rotations per minute (RPMs) while capable of very high torque densities. The presently disclosed embodiments may be advantageous over prior art mechanical gearing power generators for a variety of reasons. For instance, the electrical power generator 248, and its various embodiments described herein, may be able to generate twenty times (or higher) increased torque density over power generators that use planetary gearing. In addition, as described below, the magnetic flux multiplier assembly 250 comprises a harmonic flux multiplier that uses an interference ring partly made of highly magnetically permeable material, which increases the number of magnetic poles in the electrical power generator 248 by a high multiplier. Lastly, the electrical power generator 248, and its various embodiments described herein, provide a greater amount of electrical power through a more efficient electromechanical coupling to a low speed energy source (e.g., the roller cones 226).

Electric current generated by a magnetic field can be generalized by a variant of Maxwell's equation:

$$V = \frac{\delta B}{\delta t} \quad \text{Equation (1)}$$

where V is the stator coil output voltage or electric potential (in volts); B is the magnetic flux density (in Teslas or Webbers/meter$^2$); and t is time (in seconds). Essentially the voltage V generated is proportional to the rate of change of magnetic flux B in a winding verses time t.

Electrical power is described as:

$$P_e = V^2 \cdot (R_{loss} + R_L) \quad \text{Equation (2)}$$

where $P_e$ is electrical power (in Watts); $R_{loss}$ is electrical resistance to/from a load, such as winding resistance (in Ohms); and $R_L$ is electrical load resistance (in Ohms).

Substituting terms provides the following:

$$P_e = \left(\frac{\delta B}{\delta t}\right) \cdot (R_{loss} + R_L) \quad \text{Equation (3)}$$

Hence, the power produced is a function of the rate of change of magnetic flux density in the stator coils of the power generator. A 5× increase in rotor speed with a planetary gear, for instance, will result in a 5× increase in power output by the stator.

By being able to increase the torque density of a power generator, it is possible to increase the power coupled from rotation of the roller cone 226 to the electrical power generator 248. Mechanical power, according to the presently described embodiments, may be described as follows:

$$P_m = \omega \cdot T \quad \text{Equation (4)}$$

where $P_m$ is mechanical power (in Watts); ω is angular velocity (in radians/second); and T is torque (in Newton meters). Substituting provides:

$$P_m = \omega \cdot \rho_t \cdot Vol \quad \text{Equation (5)}$$

where $\rho_t$ is torque density (in Newton meter/meter$^3$); and Vol is the volume of generator space (in meters$^3$) within the cutter cone assembly 212. Hence, for a fixed volume of space in which the electrical power generator 248 is positioned, if the torque density is increased higher than a conventional mechanical gearing system, more electrical power may be extracted from the same volume of space.

Due to conservation of energy, the power conversion between mechanical and electrical systems can be described as follows:

$$P_e = PF \cdot P_m \quad \text{Equation (6)}$$

where PF is the power factor or the power conversion efficiency (unitless). The power factor PF is an efficiency ratio that describes efficiency of the energy conversion. It represents the losses experienced in the system during the conversion, which is wattage that is generally dissipated as heat due to a number of inefficiencies in the power conversion process.

Re-organizing and combining Equations (5) and (6) renders the following general expression for the power output of any particular generator volume:

$$P_e = PF \cdot \frac{RPM}{60} \cdot 2\pi \cdot \frac{\rho_t}{Vol} \quad \text{Equation (7)}$$

To facilitate a better understanding of the present disclosure, the following example is given, but in no way should the following example be read to limit, or to define, the scope of the disclosure. In this example, the torque density=30,000 Nm/m$^3$; RPM=100; power factor=0.9; generator diameter=0.75 inches (0.01905 meters); generator radius=0.375 inches (0.009525 meters); and generator length=2.25 inches (0.05715 meters). The expected power output may be calculated as follows:

$$P_e = 0.9 \cdot \frac{100}{60} \cdot 2\pi \cdot \frac{30,000}{\pi \cdot 0.009525^2 \cdot 0.05715} = 4.6 \text{ W}$$

Conventional geared power generators exhibit a power factor and torque density that are lower than the embodiments described herein, thereby rendering the following:

$$P_e = 0.2 \cdot \frac{100}{60} \cdot 2\pi \cdot \frac{6,000}{\pi \cdot 0.009525^2 \cdot 0.05715} = 0.2 \text{ W}$$

Accordingly, the presently described embodiments may be able to generate several watts of power out of a generator that is able to fit in the support arm 220 of the cutter cone assembly 212. The magnetic flux multiplier assembly 250 may comprise a magnetic pole multiplier, which translates into a higher flux coupling rate of change as between the permanent magnet rotor and the windings on the associated stator. As described below, the magnetic pole multiplier is achieved by adding an interference ring of ferrous material to the magnetic flux multiplier assembly 250, which creates more fluctuations in the magnetic field per shaft rotation than would normally be achievable thus an overall higher rate of change of flux versus time.

The premise of the increase in power generation is primarily due to the increase in the torque density of the direct drive power generator. The generator requires a great deal more torque to rotate the shaft than a conventional generator, due to the increase in magnetic flux change per arc length of rotation. Since power is a function of torque multiplied by rotary speed, by increasing the input torque of the generator, one can increase the input mechanical power required to turn the shaft, which results in a higher output power in the form of electrical power.

Figure 3A:
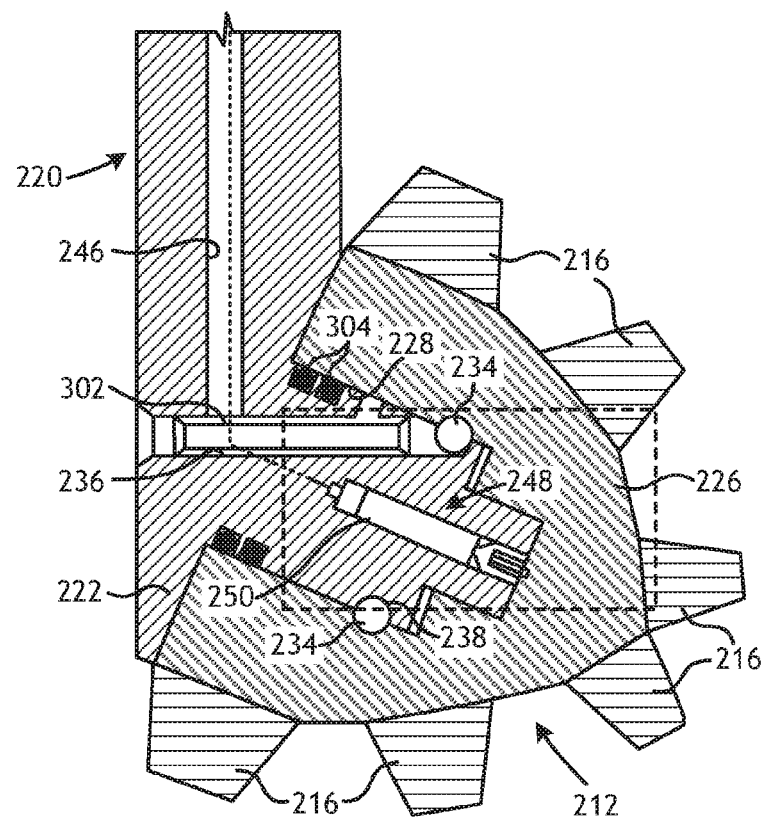
FIGS. 3A and 3B depict side and enlarged cross-sectional views, respectively, of the electrical power generator as positioned within the cutter cone assembly of FIG. 2B.
Figure 3B:
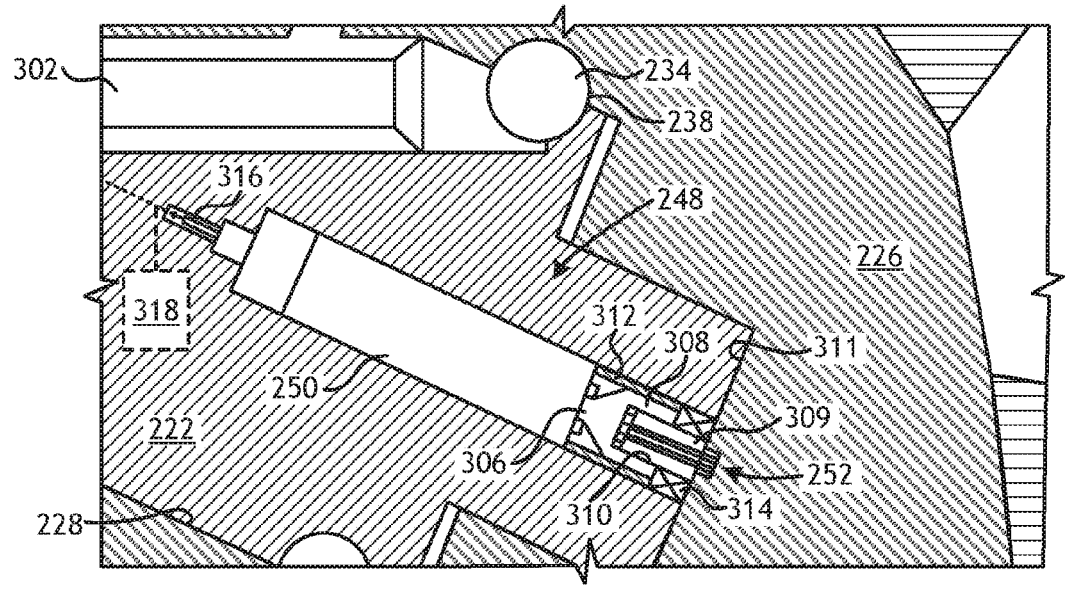

Referring now to FIGS. 3A and 3B, with continued reference to FIGS. 2A and 2B, illustrated are side and enlarged cross-sectional views, respectively, of the electrical power generator 248 as positioned within the cutter cone assembly 212 of FIG. 2B, according to one or more embodiments. More particularly, the cutter cone assembly 212 is depicted in an assembled configuration, where the roller cone 226 is mounted on the coupling 222. Similar reference numerals from FIGS. 2A-2B that are used in FIGS. 3A-3B represent like elements or components not described again in detail.

In the illustrated embodiment, a ball plug 302 is positioned within the ball passageway 236 and may be configured to help maintain the ball bearings 234 within the ball races 238 for operation. In some embodiments, the cutter cone assembly 212 may further include one or more seals 304 (two shown in FIG. 3A) positioned between an inner surface of the roller cone 226 and an outer surface of the coupling 222. In at least one embodiment, the seals 304 may be elastomeric seals, such as O-rings or the like, and may be configured to prevent the migration of fluids and/or debris into the cavity 228 that receives the coupling 222, which may otherwise contaminate the bearing surfaces of the cutter cone assembly 212.

Referring to FIG. 3B, the magnetic flux multiplier assembly 250 may, in at least one embodiment, include a rotor shaft 306 that extends out one end to operatively couple the magnetic flux multiplier assembly 250 to the roller cone 226 such that rotation of the roller cone 226 generates electricity in the magnetic flux multiplier assembly 250. In the illustrated embodiment, the rotor shaft 306 may have a head 308 that may be operatively coupled to the roller cone 226 via the torque coupling 252. As mentioned above, in at least one embodiment, the torque coupling 252 may comprise a stem 309 that is secured to and otherwise extends from a base 311 provided in the cavity 228 of the roller cone 226. In some embodiments, the stem 309 may be a flexible shaft configured to matingly engage the rotor shaft 306 at the head 308. In at least one embodiment, the stem 309 may be splined and the head 308 may define an opening 310 configured to receive the stem 309. In such embodiments, the opening 310 may include a corresponding splined engagement surface to receive the stem 309 as extended from the base 311. As the roller cone 226 rotates, the stem 309 correspondingly rotates and urges the rotor shaft 306 to rotate via the mated engagement within the head 308.

In other embodiments, as mentioned above, the rotor shaft 306 may alternatively be operatively coupled directly to the roller cone 226 in a variety of configurations, such as being inserted into a corresponding receiver opening or the like defined in the base 311 of the roller cone 226. Such a receiver opening may be configured to receive a portion of the rotor shaft 306 to engage the rotor shaft 306 to the roller cone 226. In any case, operatively coupling the rotor shaft 306 to the roller cone 226 provides for a direct drive from the rotation of the roller cone 226 into the magnetic flux multiplier assembly 250, such that rotation of the roller cone 226 correspondingly rotates the rotor shaft 306 and thereby bypasses the need for a gear assembly. In other embodiments, however, a gear assembly, such as a planetary gearing system, may interpose the roller cone 226 and the magnetic flux multiplier assembly 250, without departing from the scope of the disclosure.

In some embodiments, the electrical power generator 248 may include one or more radial bearings 312 configured to stabilize rotation of the rotor shaft 306. Moreover, in some embodiments, the electrical power generator 248 may also include one or more thrust bearings 314 to reduce the thrust loads assumed by the magnetic flux multiplier assembly 250 during operation.

The electrical power generator 248 may also include one or more electrical conductors 316 (one shown) that extend from the magnetic flux multiplier assembly 250 to provide power to electricity-consuming devices positioned in the drill bit 200 (FIGS. 2A-2B) or, as described below, in a near-bit sub. As will be described below, as the magnetic flux multiplier assembly 250 operates, electrical power is generated and conveyed by the electrical conductor 316 to various sensors and other electricity-consuming devices for consumption. In some embodiments, one or more of the electricity-consuming devices 318 may be arranged or otherwise positioned within the cutter cone assembly 212 itself, such as within the coupling 222 or the roller cone 226. The electricity-consuming device(s) 318 in the cutter cone assembly 212 may be a variety of sensors such as, but not limited to, a temperature sensor, a pressure sensor, a gamma ray sensor, a resistivity sensor, a mud viscosity sensor, a seismic sensor, a strain sensor, an RPM sensor, a formation sensor, and any combination thereof.

Figure 4:
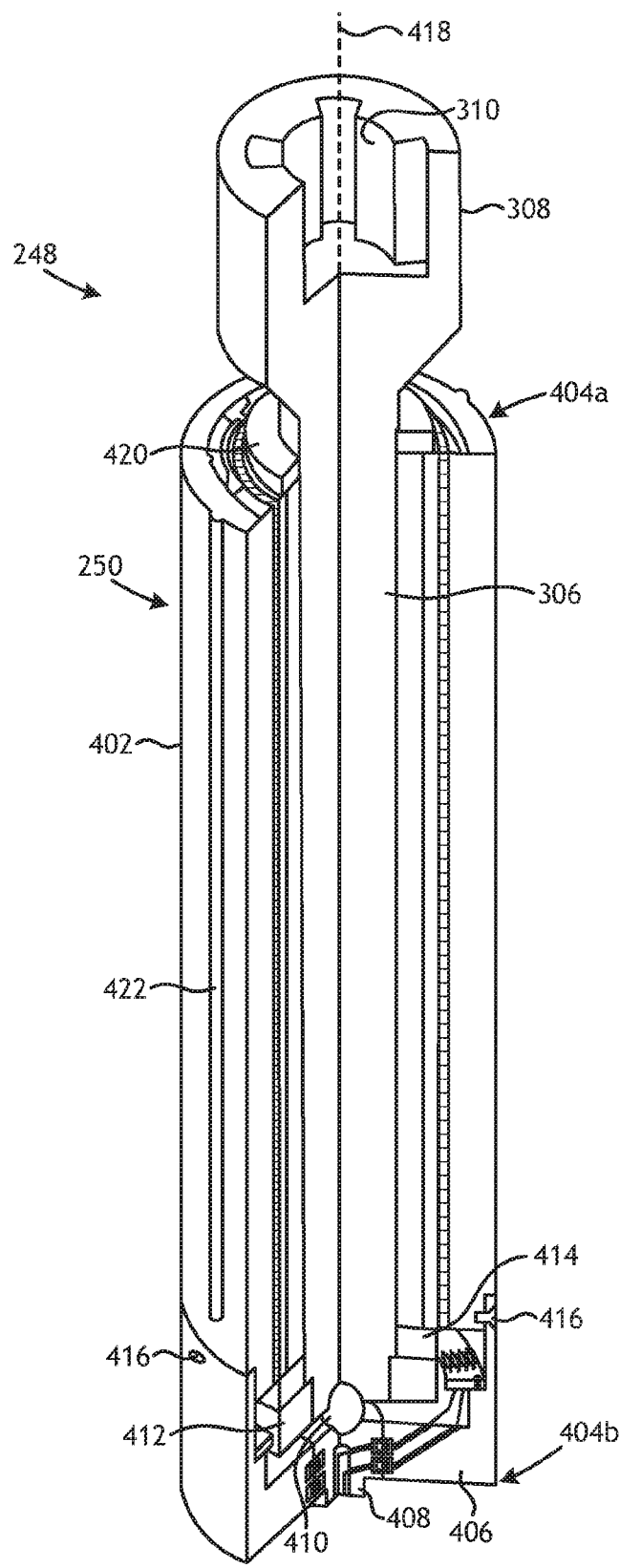
FIG. 4 depicts a partial cut-away view of the electrical power generator of FIG. 3A-3B.

Referring now to FIG. 4, with continued reference to the prior figures, illustrated is a partial cut-away view of the electrical power generator 248 of FIGS. 3A-3B, according to one or more embodiments. As illustrated, the electrical power generator 248 includes the magnetic flux multiplier assembly 250, which provides an elongate stator body 402 having a first or input end 404a and a second or output end 404b. The rotor shaft 306 is depicted as extending between the first and second ends 404a,b, and the head 308 extends out of the first end 404a a short distance. The opening 310 in the head 308 is depicted as providing a splined engagement that may be configured to receive the stem 309 of FIG. 3B, for example.

At the second end 404b, the magnetic flux multiplier assembly 250 may include an end cap 406, a journal arm connector 408, a centralizer bearing 410, a retaining nut 412, and a bushing 414. The end cap 406 may be configured to secure the journal arm connector 408 to the stator body 402 with one or more mechanical fasteners 416. In other embodiments, the end cap 406 may alternatively be secured to the stator body 402 using other attachment means including, but not limited to, welding, brazing, adhesives, shrink fitting, and any combination thereof. The journal arm connector 408 may be secured within the end cap 406 and may provide axial support to the rotor shaft 306 in conjunction with the centralizer bearing 410. As illustrated, the centralizer bearing 410 may be a ball bearing or the like, and may be configured to allow the rotor shaft 306 to rotate about a central axis 418 during rotation. The centralizer bearing 410 may also serve as a thrust bearing from the rotor shaft 306. The retaining nut 412 may be configured to help axially retain the rotor shaft 306 within the stator body 402, and the bushing 414 may help mitigate radial and thrust loads assumed within the magnetic flux multiplier assembly 250.

At the first end 404a, the magnetic flux multiplier assembly 250 may include a retaining ring 420 configured to secure the components of the magnetic flux multiplier assembly 250 within the stator body 402. In some embodiments, as illustrated, the stator body 402 may have one or more anti-rotation keys 422 defined longitudinally along the outer surface of the stator body 402. The anti-rotation key(s) 422 may be configured to mate with complimentary slots (not shown) defined in the coupling 222 (FIG. 3B) to prevent the stator body 402 from rotating during operation.

Figure 5A:
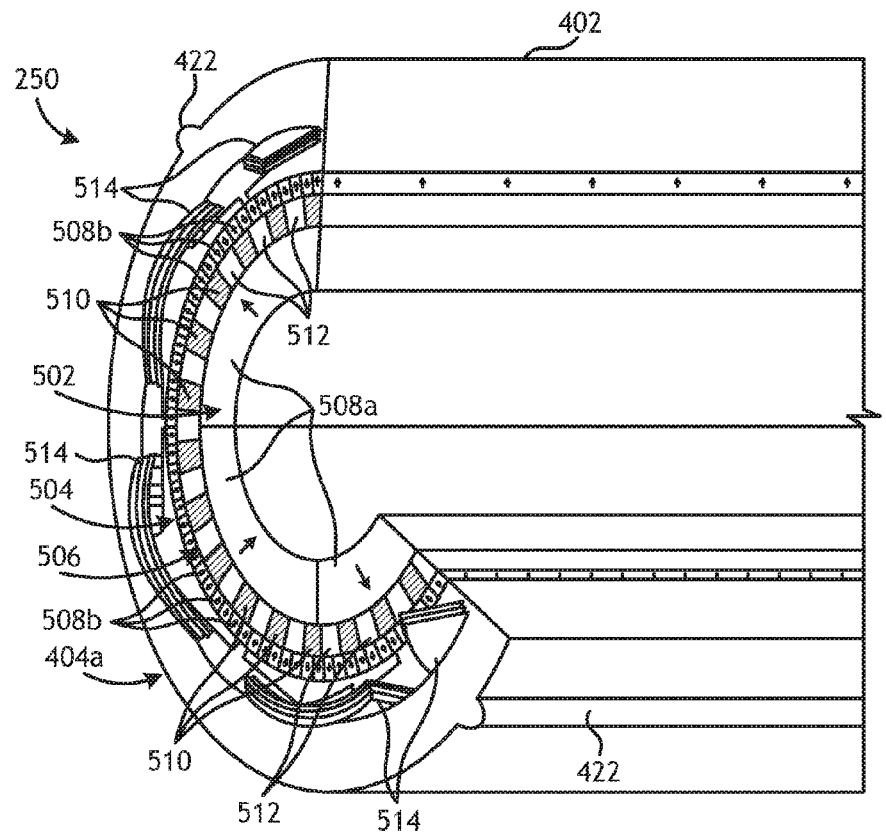
FIGS. 5A and 5B depict partial cut-away views of the first and second ends, respectively, of the magnetic flux multiplier assembly of FIG. 4.
Figure 5B:
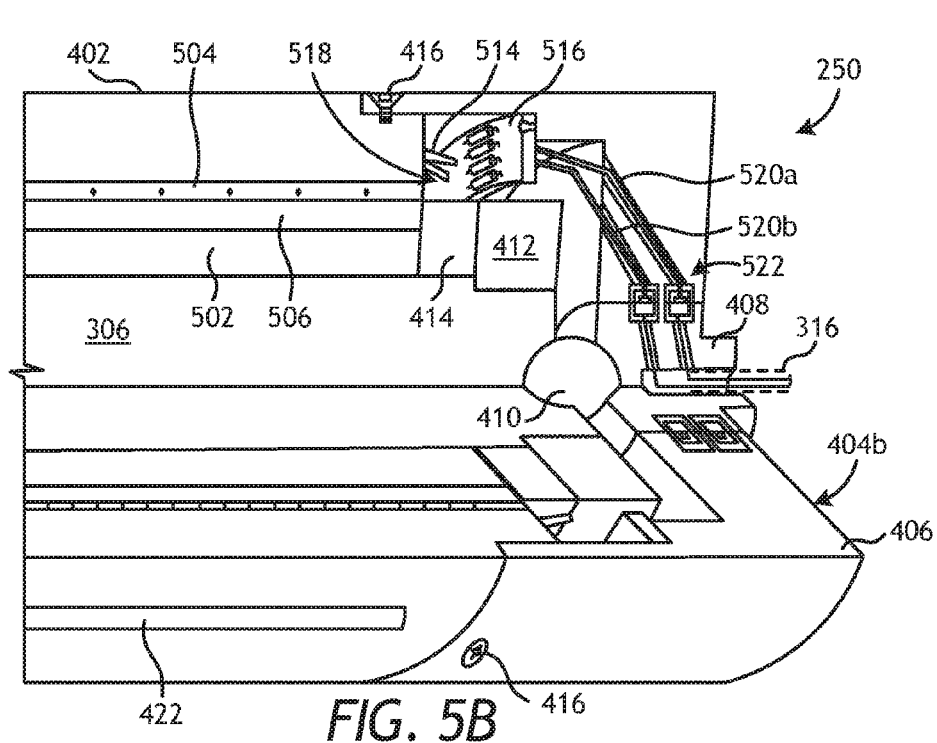

Referring now to FIGS. 5A and 5B, with continued reference to FIG. 4, illustrated are partial cut-away views of the first and second ends 404a,b of the magnetic flux multiplier assembly 250, respectively. Similar reference numerals from FIGS. 2A-2B, FIGS. 3A-3B, and FIG. 4 that are used in FIGS. 5A-5B represent like elements or components not described again in detail.

In FIG. 5A, the first end 404a of the stator body 402 is shown, with the rotor shaft 306 (FIGS. 3B and 4) omitted for ease of viewing the internal components of the magnetic flux multiplier assembly 250. As illustrated, the magnetic flux multiplier assembly 250 may include a first or inner magnetic ring 502, a second or outer magnetic ring 504, and an interference ring 506 that interposes the inner and outer magnetic rings 502, 504. The inner and outer magnetic rings 502, 504 and the interference ring 506 each form concentric, cylindrical rings that extend longitudinally between the first and second ends 404a,b of the stator body 402.

In the illustrated embodiment, the inner magnetic ring 502 may comprise a plurality of magnets 508a that are attached to the rotor shaft 306 (FIGS. 3B and 4) such that rotation of the rotor shaft 306 results in rotation of the magnets 508a of the inner magnetic ring 502 relative to the outer magnetic ring 504. In some embodiments, the magnets 508a of the inner magnetic ring 502 may be mechanically fastened to the rotor shaft 306, such as being screwed or bolted onto the outer radial surface of the rotor shaft 306. In other embodiments, the magnets 508a of the inner magnetic ring 502 may be secured to the rotor shaft 306 with an adhesive. In at least one embodiment, the rotor shaft 306 may define or otherwise provide corresponding pockets or recesses (not shown) configured to receive the magnets 508a of the inner magnetic ring 502.

The outer magnetic ring 504 may also comprise a plurality of magnets 508b. In the illustrated embodiment, the outer magnetic ring 504 may be secured to the inner surface of the stator body 402 and, therefore, may be prevented from rotation. In other embodiments, however, the outer magnetic ring 504 may rotate with respect to the inner magnetic ring 502, as described in more detail below.

The magnets 508a,b may be any type of permanent magnet. Suitable magnets 508a,b that may be used include, but are not limited to, neodymium iron boron (NdFeB) magnets, bonded NdFeB magnets, samarium cobalt magnets, alnico magnets, ceramic (hard ferrite) magnets, and any combination thereof. The type of magnet 508a,b employed may depend on temperature conditions where the magnetic flux multiplier assembly 250 may be used. For instance, samarium cobalt magnets may be used in most applications, but for lower temperature applications, NdFeB magnets or bonded NdFeB magnets may be used and may result in an increase in generator performance.

The arrows depicted on each magnet 508a,b indicate the magnetic dipole direction, which is usually in the direction of the North pole of the given magnet 508a,b. While the magnets 508a,b of each of the inner and outer rings 502, 504 are depicted as engaging angularly adjacent magnets 508a,b on either side, in some embodiments, a small gap (not shown) may be defined between angularly adjacent magnets 508a,b. Such a gap may encourage more flux leakage along the dipole axis of the given magnet 508a,b.

In the illustrated embodiment, the interference ring 506 may float between the inner and outer magnetic rings 502, 504 and may include a plurality of alternating ferromagnetic pole pieces 510 and spacers 512. The ferromagnetic pole pieces 510 may be made of a ferromagnetic material such as, but not limited to, a nickel-iron magnetic alloy (e.g., permalloy) or iron. Ideally, the material may exhibit the highest magnetic relative permeability possible while still retaining the mechanical strength required for the interference ring 506. When using iron, for example, the best kind of iron would be fully annealed iron or soft iron as which is often used in the making of transformer cores. Permalloy presents some of the highest relative magnetic permeability ranging up to 20,000-50,000 while very soft (annealed) pure iron of 99.95% can range up to 200,000. Further, stacks of Metglas, which is an amorphous metal alloy ribbon that exhibits a relative permeability of over 1,000,000, could also conceivably be used. However, the most practical material to work with is strips of annealed iron given the need to carry mechanical loadings from the reactions to the magnetic attraction and repulsion forces present in the generator assembly. The permeability of the ferromagnetic pole pieces 510 may be in the range of about 3,000 for iron alloys having the mechanical strength properties required, and much higher for nickel-iron magnetic alloys.

The spacers 512 may be made of or comprise a variety of materials that are non-conductive and/or non-magnetic. Suitable materials for the spacers 512 include, but are not limited to, a polymer (e.g., polyether ether ketone (PEEK)), tin, copper, brass, beryllium-copper alloys, titanium, aluminum, monel, austenitic stainless steel (e.g., NITRONIC® 50 or 60), a cobalt-nickel alloy (e.g., AERMET®), a carbon composite material or other composite, and any combination thereof. Further, the spacers 512 can serve as a partial or continuous carrier for the ferromagnetic pole pieces 510 by providing mounting and support for the ferromagnetic pole pieces 510. In some embodiments, the spacers 512 may comprise empty spaces that interpose angularly adjacent ferromagnetic pole pieces 510 about the circumference of the interference ring 506.

The plurality of alternating ferromagnetic pole pieces 510 and spacers 512 may be held together mechanically or chemically. In some embodiments, for instance, angularly adjacent ferromagnetic pole pieces 510 and spacers 512 may be secured together with complimentary butterfly or dovetail slots. In other embodiments, the interference ring 506 may be encased in a magnetically-permeable and non-magnetic carrier or casing, such as a polymer (e.g., PEEK) casing molded about the interference ring 506. In other embodiments, a polymer (e.g., PEEK) may be injection molded around the ferromagnetic pole pieces 510 and, therefore, the polymer may comprise the spacers 512. In yet another embodiment, the non-magnetic portion of the interference ring 506 may be shaped with a continuous or semi-continuous diameter to act as a support or tray for the ferromagnetic pole pieces 510.

The magnetic flux multiplier assembly 250 may further include a plurality of coil windings 514 disposed within the stator body 402, also referred to herein as an "armature." In the illustrated embodiment, the magnets 508b of the outer magnetic ring 504 may be communicably coupled to the coil windings 514 for electrical power generation. In some embodiments, as illustrated, there may be six coil windings 514 positioned on the armature (the stator body 402) and configured for three-phase power. As will be appreciated, however, the design of the magnetic flux multiplier assembly 250 may be altered to produce two-phase power or four-phase power, without departing from the scope of the disclosure.

In exemplary operation of the magnetic flux multiplier assembly 250, as the rotor shaft 306 (FIGS. 3B and 4) rotates, the magnets 508a of the inner magnetic ring 502 correspondingly rotate relative to the outer magnetic ring 504. The ferromagnetic pole pieces 510 may be configured to modulate the magnetic fields exhibited by the inner and outer magnetic rings 502, 504. Interaction of the magnetic fields of the inner and outer magnetic rings 502, 504 induces electrical power (current) in the coil windings 514, which, as discussed below, can be captured and used to power one or more electricity-consuming devices. In a preferred embodiment, the interference ring 506 may float freely between the inner and outer magnetic rings 502, 504. The magnetic forces generally keep the interference ring 506 centralized and thereby allow it to rotate within a magnetic bearing structure created by the repulsion and attraction of the various magnetic dipoles created within the ferromagnetic material.

In the illustrated embodiment, the inner magnetic ring 502 includes four magnets 508a or two pole-pairs arranged to produce a spatially varying magnetic field. Moreover, the outer magnetic ring 504 includes forty-four magnets 508b or twenty-two pole-pairs arranged to also produce a spatially varying magnetic field. It will be appreciated, however, that the number of magnets 508a,b, ferromagnetic pole pieces 510, and coil windings 514 may vary depending on the application and depending on various optimizations intended to enhance operation of the magnetic flux multiplier assembly 250.

In FIG. 5B, the rotor shaft 306, the inner and outer magnetic rings 502, 504 and the interference ring 506 are each depicted as extending toward the second end 404b of the stator body 402 where the end cap 406 is secured. The centralizer bearing 410 is depicted as interposing the axial end of the rotor shaft 306 and the journal arm connector 408.

In some embodiments, the magnetic flux multiplier assembly 250 may further include a rectifier board 516 arranged at or near the second end 404b of the stator body 402. Each coil winding 514 (one shown) may loop around at the second end 404b to complete the coil loop, and the ends 518 of each coil winding 514 may be connected to the rectifier board 516, which converts the alternating current (AC) derived from operation of the magnetic flux multiplier assembly 250 to direct current (DC). The rectifier board 516 may be a standard bridge rectifier set up for three-phase power, and may convert the AC into a rectified positive voltage line 520a and a negative voltage line 520b. As illustrated, the positive and negative voltage lines 520a,b may run to corresponding plunger connector rings 522, which allow electrical communication into the journal arm connector 408.

While this embodiment is optional, it may prove advantageous in permitting only the need for a minimum of one voltage line 520a,b to lead from the magnetic flux multiplier assembly 250 and the other voltage line 520a,b could be grounded to the stator body 402. Ideally, though, it is better to run both voltage lines 520a,b back to the power conditioning system elsewhere in the system. Accordingly, two voltage lines 520a,b are shown. If the windings were not rectified, then at least one wire from each winding would have to be run to the power conditioning system elsewhere in the drill bit. The additional power conditioning circuitry can consist of smoothing capacitors, step up or down voltage transformers, switch power supply circuits and other semiconductors used to condition the power, voltage and current into a desirable format. To maximize power generation, the rectifiers could be dropped entirely from the generator section and one could ground to the stator body 402 one end 518 of each armature coil winding 514, thus using the bit body 218 (FIG. 2A-2B) as a ground, assuming the stator body 402 is in electrical contact with the bit body 218, and run the other end 518 of the armature coil winding 514 wire to the power conditioning circuits elsewhere in the system. This would maximize the available volume in the cone area solely for power generation capacity only. In all cases, current carrying cables, such as the voltage lines 520a,b, may have a dielectric insulator around them to prevent electrical shorting to other electrically conductive paths in the magnetic flux multiplier assembly 250, the drill bit 200 (FIGS. 2A-2B), or other conductor cables or wires.

The electrical conductor 316 or "power cable" may extend from the journal arm connector 408 to, for example, a power controller board (not shown) or the like elsewhere in the drill bit 200 (FIGS. 2A-2B). In other embodiments, as described below, the electrical conductor 316 may extend to a near-bit sub that may be connected to the drill bit 200. At the power controller board, the voltage provided by the electrical conductor 316 may be smoothed through the use of one or more capacitors (not shown) to make it more usable for electronic circuits and, more particularly, for downhole electricity-consuming devices. The capacitors used to condition the voltage may be, for example, tantalum capacitors, which may not be able to withstand high-pressure environments. The rectifiers of the rectifier board 516, however, may be able to withstand high-pressure environments and, therefore, may be placed in a non-pressurized cavity, such as is shown in FIG. 5B. In at least some embodiments, the magnetic flux multiplier assembly 250 may be immersed in a dielectric fluid, such as the lubrication oil provided from the lubricant chamber 240 (FIG. 2B). In other embodiments, however, the magnetic flux multiplier assembly 250 may be sealed and otherwise isolated from mixing with the lubrication oil, which may result in improving reliability and longevity of the magnetic flux multiplier assembly 250 by keeping debris from wearing wear out the generator. In such an embodiment, a rotary seal or magnetic coupling (not shown) on the input shaft would be required to isolate the two areas within the cone while permitting the transference of rotational energy from the cone into the magnetic flux multiplier assembly 250.

Figure 6A:
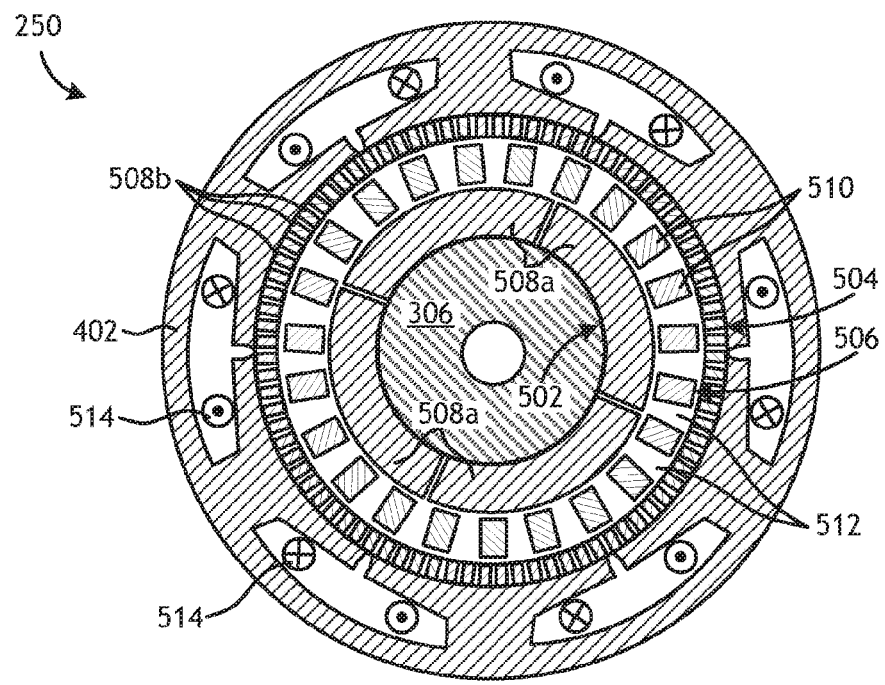
FIGS. 6A-6C are cross-sectional end views of the magnetic flux multiplier assembly of FIG. 4.
Figure 6B:
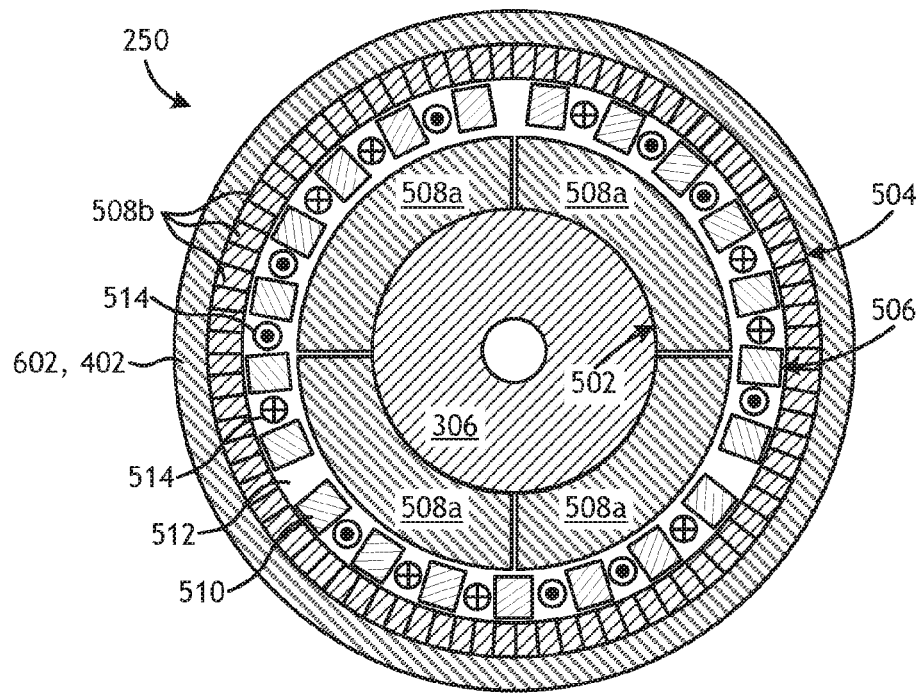
Figure 6C:
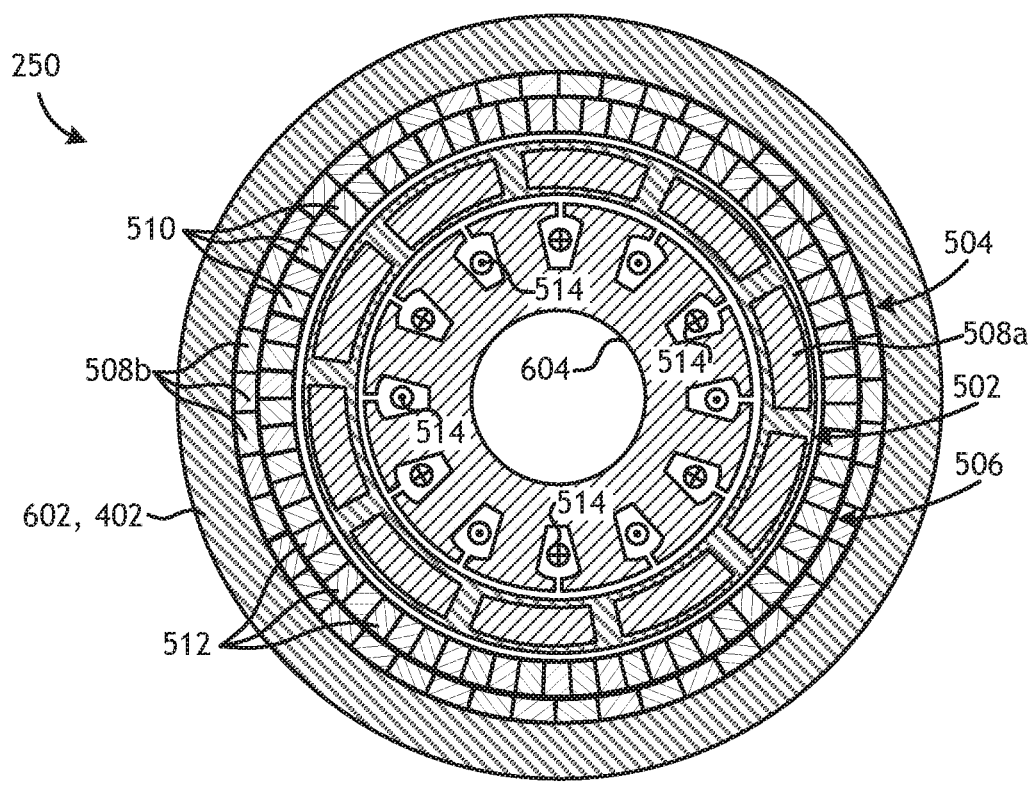

Referring now to FIGS. 6A-6C, illustrated are cross-sectional end views of the magnetic flux multiplier assembly 250, according to at least three embodiments. More particularly, FIGS. 6A-6C depict end views of different configurations of the magnetic flux multiplier assembly 250 as looking at the first end 404a of the stator body 402 (FIGS. 4 and 5A). As will be appreciated, the configurations of the internal components of the magnetic flux multiplier assembly 250 may vary depending on the application. Indeed, the concentric position and location of the first and second magnetic rings 502, 504 and the interference ring 506 may vary, and the position of the coil windings 514 may also vary, without departing from the scope of the disclosure.

In FIG. 6A, a first exemplary configuration of the magnetic flux multiplier assembly 250 is depicted. The first configuration is similar to or the same as the configuration shown and described above with reference to FIG. 5A. As illustrated, the first magnetic ring 502 and associated magnets 508a are mounted to or otherwise form part of the rotor shaft 306, and the second magnetic ring 504 and associated magnets 508b are secured to the inner wall of the stator body 402. The interference ring 506, including its associated ferromagnetic pole pieces 510 and spacers 512, interposes the first and second magnetic rings 502, 504. In the illustrated embodiment, the spacers 512 comprise corresponding empty spaces between angularly adjacent ferromagnetic pole pieces 510. Moreover, the coil windings 514 are arranged within corresponding armatures positioned within the stator body 402. The crosses and points depicted with respect to the coil windings 514 illustrate the polarity of the coils.

In exemplary operation, the rotor shaft 306 and the first magnetic ring 502 rotate relative to the second magnetic ring 504, and the interference ring 506 floats between the first and second magnetic rings 502, 504 to modulate the corresponding magnetic fields. Electrical power (current) is generated in the coil windings 514 as the magnetic fields of the inner and outer magnetic rings 502, 504 interact. In the illustrated embodiment, the rotor shaft 306 may be directly driven from rotation of the roller cone 226 (FIGS. 2B and 3A-3B). As a result, no mechanical gearing is required since the magnetic flux multiplier assembly 250 is able to modulate the flux through the coil windings 514 at a higher rate that is usually a harmonic of the input speed.

In FIG. 6B, a second exemplary configuration of the magnetic flux multiplier assembly 250 is depicted. Similar to the first configuration, the first magnetic ring 502 and associated magnets 508a are mounted to or otherwise form part of the rotor shaft 306 in the second configuration. Unlike the first configuration, however, the second magnetic ring 504 and associated magnets 508b may be secured to a rotatable substrate 602, which, in some embodiments, may be the inner wall of the stator body 402. Moreover, the interference ring 506, including its associated ferromagnetic pole pieces 510 and spacers 512, interposes the first and second magnetic rings 502, 504 but may be a stationary member within the magnetic flux multiplier assembly 250. In the illustrated embodiment, the coil windings 514 are looped around the angularly adjacent ferromagnetic pole pieces 510.

In FIG. 6C, a third exemplary configuration of the magnetic flux multiplier assembly 250 is depicted. In the third configuration, a central armature or stator 604 is provided and affords a location to position the coil windings 514. The first magnetic ring 502 and associated magnets 508a are mounted to the stator 604 and, as a result, do not move during operation. Similar to the second configuration, the second magnetic ring 504 and associated magnets 508b may be secured to the rotatable substrate 602, which, in some embodiments, may be the inner wall of the stator body 402. Moreover, the interference ring 506, including its associated ferromagnetic pole pieces 510 and spacers 512, interposes the first and second magnetic rings 502, 504 but may float to modulate the corresponding magnetic fields within the magnetic flux multiplier assembly 250.

Figure 7:
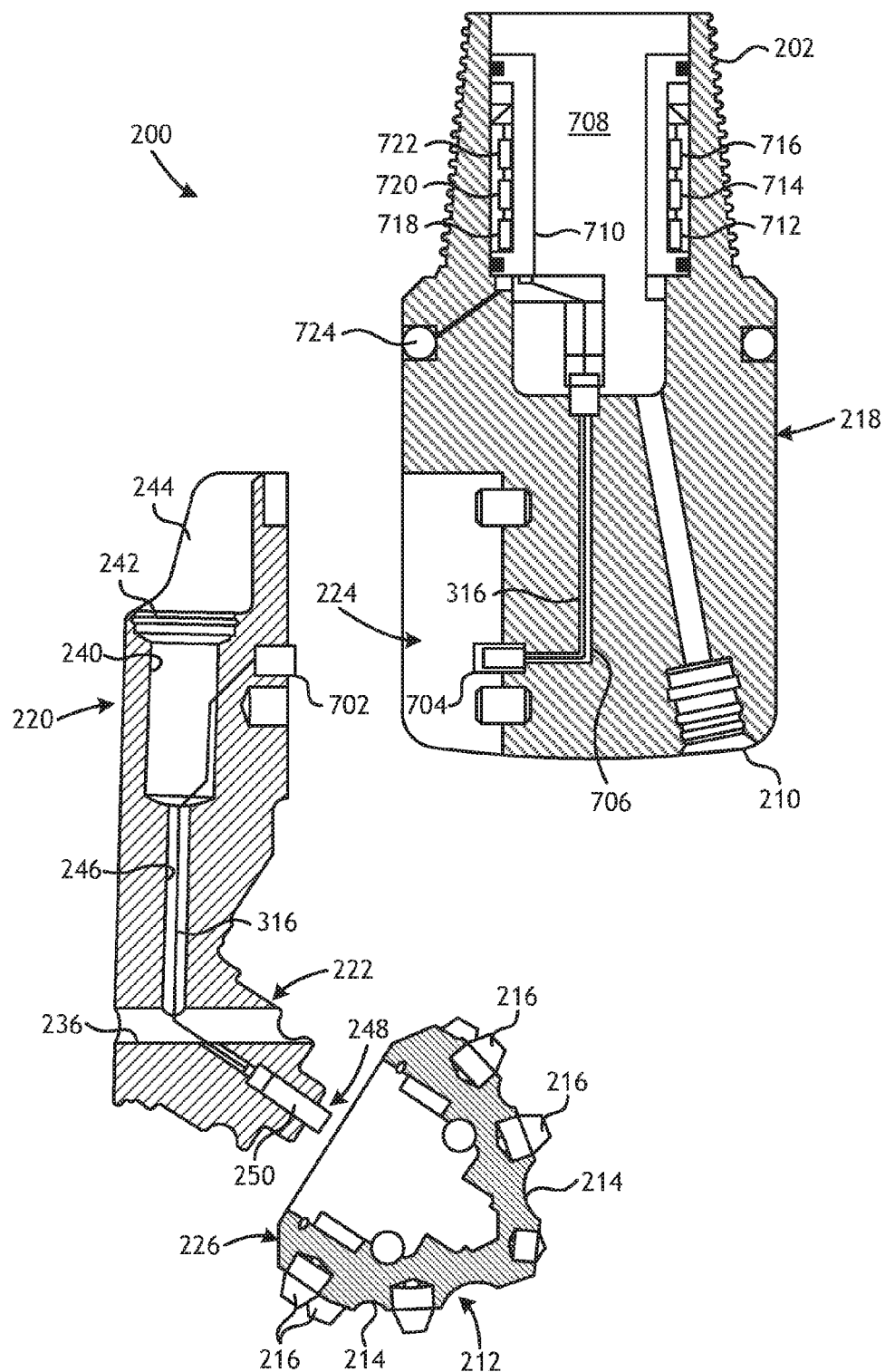
FIGS. 7 and 8 depict exploded cross-sectional views of the portion of the drill bit of FIG. 2B.
Figure 8:
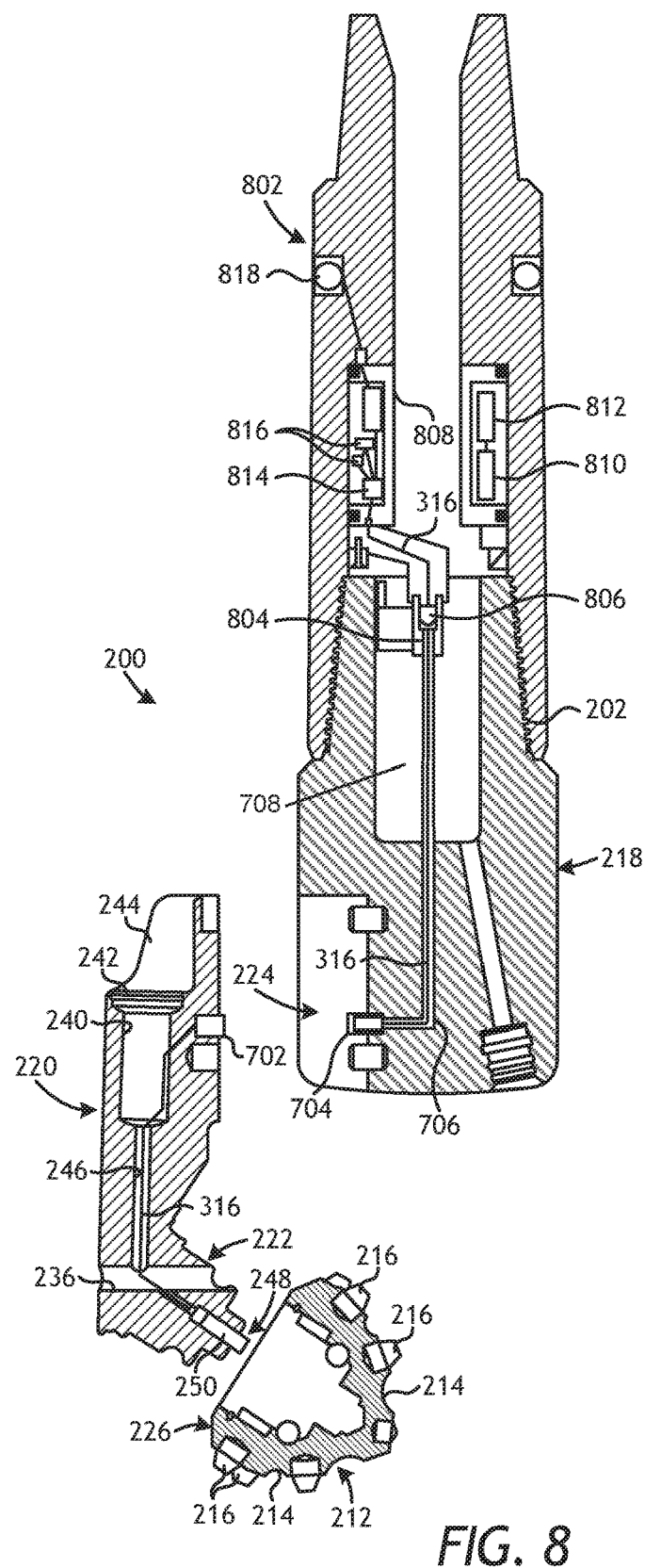

Referring now to FIGS. 7 and 8, illustrated are exploded cross-sectional views of the portion of the drill bit 200 of FIG. 2B, according to at least two embodiments. More particularly, FIGS. 7 and 8 depict exemplary embodiments where the electrical power generator 248 positioned within the cutter cone assembly 212 is able to provide electrical power to various electricity-consuming devices. Similar reference numerals from FIG. 2B that are used in FIGS. 7 and 8 represent like elements or components that will not be described again.

In each of FIGS. 7 and 8, the electrical conductor 316 extending from the magnetic flux multiplier assembly 250 may extend to a sealable connector 702 positioned on the support arm 220. In some embodiments, as illustrated, the electrical conductor 316 may extend to the sealable connector 702 via the pressure compensator system of the drill bit 200, which may include the lubricant chamber 240, the lubricant conduit 246, and the ball passageway 236. Accordingly, the electrical conductor 316 may extend to the sealable connector 702 by extending through each of the lubricant chamber 240, the lubricant conduit 246, and the ball passageway 236. In other embodiments, however, a conduit (not shown) may be drilled or otherwise formed within the support arm 220 that extends directly to the sealable connector 702, without departing from the scope of the disclosure.

The sealable connector 702 may be a male connector configured to mate with a corresponding female connector 704 positioned or otherwise arranged within the pocket 224 on the bit body 218. Upon attaching the support arm 220 to the bit body 218 at the associated pocket 224, the sealable connector 702 and the female connector 704 may matingly engage to provide an electrical connection therebetween. Communicably coupling the sealable connector 702 and the female connector 704 may effectively extend the electrical conductor 316 into the bit body 218 and, more particularly, into a conduit 706 defined in the bit body 218 that extends to a drilling fluid cavity 708 formed in the bit body 218.

In FIG. 7, the electrical conductor 316 may extend and provide electrical power to an electronics unit 710 arranged or otherwise positioned within the drilling fluid cavity 708. The electronics unit 710 may include one or more electricity-consuming devices configured to consume the electrical power provided by the electrical power generator 248 via the electrical conductor 316. In some embodiments, for instance, the electronics unit 710 may include power-conditioning circuitry, such as one or more capacitors 712 and/or one or more rectifiers 714. The electronics unit 710 may further include one or more power storage devices 716, such as a battery or the like, that may be charged by the electrical power provided by the electrical conductor 316. In other embodiments, the power storage devices 716 may be used for powering the electricity-consuming devices in the electronics unit 710 when the magnetic flux multiplier assembly 250 is not producing power, such as is the case when the drill bit 200 is off of the bottom of the hole during trips. However, in some embodiments, the magnetic flux multiplier assembly 250 may be able to provide power simultaneously to both the electronics unit 710 and the power storage devices 716. This stored energy can then be used when the magnetic flux multiplier assembly 250 is not able to produce electrical power when the drill bit 200 is off bottom. Further, electrical power can be transmitted from the drill bit 200 to any other point in the drill string over a power transmission cable or electrical conductive path, such as an electric cable, electric connectors, an inductive coupling, or any combination thereof, to power other devices in the drill string, such as a rotary steerable tool, an MWD tool or an LWD tool.

In one or more embodiments, the electronics unit 710 may also include a sensor controller 718 and one or more sensors 720 communicably coupled to and otherwise controlled by the sensor controller 718. Suitable sensors 720 may include, but are not limited to, a temperature sensor, a pressure sensor, a gamma ray sensor, a resistivity sensor, a mud viscosity sensor, a seismic sensor, a strain sensor, an RPM sensor, a drilling force sensor (e.g., a rotary speed sensor), a rotary position sensor, a rotary acceleration sensor, a rotary jerk sensor (i.e., a rate of change of acceleration), an axial load sensor, a cross-axis load sensor, a torque sensor, a bend sensor, a bend direction sensor, a formation sensor, and any combination thereof.

In yet other embodiments, the electronics unit 710 may also include a telemetry module 722. The telemetry module 722 may be communicably coupled to the sensors 720 and/or the sensor controller 718 and may be configured to transmit data obtained by the sensors 720 to a BHA telemetry module (not shown) positioned uphole from the drill bit 200. In other embodiments, the telemetry module 722 may be configured to transmit the data directly to a surface location for consideration. The telemetry module 722 may be any downhole telemetering device known to those skilled in the art including, but not limited to, mud pulse telemetry, electromagnetic telemetry, acoustic telemetry, ultrasonic telemetry, electrical lines, fiber optic lines, radio frequency transmission, or any combination thereof. The electronics unit 710 may further include a toroid 724. The toroid 724 may be configured to create an electrical dipole voltage across at least a portion of the drill string to generate electrical current used for electromagnetic telemetry. In this instance one could use the toroid 724 to bi-directionally communicate with a long haul telemetry system elsewhere in the BHA 104 (FIG. 1), thereby reducing the amount of space required near the bit that would be required to support a long haul telemetry system that communicates with the surface.

In FIG. 8, the drill bit 200 may have a near-bit sub 802 coupled thereto and otherwise attached at the threaded pin connection 202. The electrical conductor 316 in FIG. 8 may extend from the conduit 706 to a center-supported rotary connector 804 positioned within the drilling fluid cavity 708 at or near the top of the drill bit 200. In some embodiments, the rotary connector 804 may comprise a female fitting configured to receive a male circular plunger connector 806 that is operatively coupled to an electronics unit 808 arranged or otherwise positioned within the near-bit sub 802. Communicably coupling the rotary connector 804 and the circular plunger connector 806 may effectively extend the electrical conductor 316 into the near-bit sub 802 and, more particularly, to the electronics unit 808 to provide electrical power thereto.

Similar to the electronics unit 710 of FIG. 7, the electronics unit 808 may include one or more electricity-consuming devices configured to consume the electrical power provided by the electrical power generator 248 via the electrical conductor 316. More particularly, for instance, the electronics unit 808 may include power-conditioning circuitry 810, such as one or more capacitors and/or one or more rectifiers. The electronics unit 808 may further include one or more power storage devices 812, such as a battery or the like, that may be charged by the electrical power provided by the electrical conductor 316. In one or more embodiments, the electronics unit 808 may also include a sensor controller 814 and one or more sensors 816 that may be controlled by the sensor controller 814. Suitable sensors 816 are the same as the sensors 720 mentioned above. In yet other embodiments, the electronics unit 808 may also include and power a telemetry module 818 similar to the telemetry module 722 of FIG. 7. Lastly, the electronics unit 808 may further include a toroid 818.

It will be appreciated that, while the magnetic flux multiplier assembly 250 is shown associated with only one roller cone 226 on the drill bit 200, other embodiments are contemplated where the magnetic flux multiplier assembly 250 may be associated with some or all of the roller cones 226. In such an embodiment, a centralized power conditioning system may be able to condition the power from the power feed from all power generating roller cones 226 in the drill bit 200.

Moreover, it will be appreciated that the magnetic flux multiplier assembly 250 may be retrievable and otherwise reusable in multiple types or configurations of drill bits, such as a drill bit other than the drill bit 200. More particularly, when the drill bit 200 has reached its usable lifespan, the drill bit 200 may be retrieved to a surface location, and the roller cone 226 may be disassembled to access the magnetic flux multiplier assembly 250. The magnetic flux multiplier assembly 250 may then be removed from the drill bit 200, refurbished in any manner necessary as needed and potentially used in another drill bit, while the drill bit 200 is discarded or otherwise scrapped. Furthermore, the electronics units 710, 808 of FIGS. 7 and 8, respectively, and their various electricity-consuming devices, may also be removable, refurbishable and reusable in other drilling tool applications. In some embodiments, the electricity-consuming devices in the electronics units 710, 808 may be removable and otherwise able to be extracted for servicing, rehabilitation, or replacement.

Embodiments disclosed herein include:

A. A drill bit that includes a bit body defining at least one pocket, a support arm attachable to the bit body at the at least one pocket and including a coupling that extends from the support arm, a roller cone defining a cavity for receiving the coupling to rotatably mount the roller cone on the coupling, and a direct drive electrical power generator positioned within the coupling and operatively coupled to the roller cone such that rotation of the roller cone correspondingly rotates a portion of the direct drive electrical power generator to generate electrical power.

B. A method that includes introducing a drill string into a wellbore, the drill string having a drill bit positioned at a distal end thereof and the drill bit including a bit body defining at least one pocket, a support arm attachable to the bit body at the at least one pocket and including a coupling that extends from the support arm, the drill bit further including a roller cone that defines a cavity for receiving the coupling to rotatably mount the roller cone on the coupling, rotating the drill string within the wellbore and thereby rotating the roller cone on the coupling, rotating a portion of a direct drive electrical power generator positioned within the coupling as the roller cone rotates, the portion of the direct drive electrical power generator being operatively coupled to the roller cone, and generating electrical power with the direct drive electrical power generator as the portion of the direct drive electrical power generator rotates.

C. A rotary cone drill bit that includes a bit body defining at least one pocket, a cutter cone assembly attachable to the bit body at the at least one pocket and including a roller cone, and a magnetic flux multiplier assembly positioned within the cutter cone assembly and operatively coupled to a roller cone such that rotation of the roller cone correspondingly rotates a rotor shaft of the magnetic flux multiplier assembly to generate electrical power, wherein the magnetic flux multiplier assembly includes a first magnetic ring, a second magnetic ring, an interference ring that interposes the first and second magnetic rings, and a plurality of coil windings communicably coupled to one of the first and second magnetic rings, and wherein the first and second magnetic rings and the interference ring are concentrically-located and, of the first and second magnetic rings and the interference ring, one is a rotating member operatively coupled to the roller cone for rotation therewith, one is a floating member, and one is a stationary member.

Each of embodiments A, B, and C may have one or more of the following additional elements in any combination: Element 1: wherein the direct drive electrical power generator is directly coupled to an inner wall of the cavity when the roller cone is mounted on the coupling. Element 2: further comprising a stem extending from a wall of the cavity, wherein the stem is engageable with a rotor shaft of the direct drive electrical power generator. Element 3: wherein an electrical conductor extends from the direct drive electrical power generator to convey the electrical power to one or more electricity-consuming devices. Element 4: wherein the one or more electricity-consuming devices are selected from the group consisting of a sensor controller, a temperature sensor, a pressure sensor, a gamma ray sensor, a resistivity sensor, a mud viscosity sensor, a seismic sensor, a strain sensor, an RPM sensor, a formation sensor, an electronics unit, a capacitor, a rectifier, a power storage device, a battery, a rechargeable battery, a telemetry module, and a toroid. Element 5: wherein the one or more electricity-consuming devices are positioned within at least one of the coupling, the support arm, and the roller cone. Element 6: wherein the one or more electricity-consuming devices are positioned within a drilling fluid cavity defined within the bit body. Element 7: further comprising a lubricant chamber defined within the support arm, a lubricant conduit in fluid communication with the lubricant chamber and defined in the support arm, and a ball passageway in fluid communication with the lubricant conduit and defined in the coupling, wherein the electrical conductor extends through at least the ball passageway, the lubricant conduit, and the lubricant chamber to reach the drilling fluid cavity. Element 8: wherein the one or more electricity-consuming devices are positioned within a near-bit sub coupled to the bit body at a threaded pin connection. Element 9: wherein the direct drive electrical power generator is a magnetic flux multiplier assembly comprising a first magnetic ring having a first plurality of magnets, a second magnetic ring having a second plurality of magnets, wherein a number of the first plurality of magnets is different than a number of the second plurality of magnets, an interference ring that interposes the first and second magnetic rings and includes a plurality of ferromagnetic pole pieces alternating with a plurality of spacers, the interference ring being configured to modulate magnetic fields exhibited by the first and second magnetic rings, and a plurality of coil windings communicably coupled to one of the first and second magnetic rings and operable to conduct electrical power through interaction of the magnetic fields of the first and second magnetic rings, wherein the first and second magnetic rings and the interference ring are concentrically-located, and wherein, of the first and second magnetic rings and the interference ring, one is a rotating member, one is a floating member, and one is a stationary member, and wherein the rotating member is operatively coupled to the roller cone for rotation therewith. Element 10: wherein the first and second pluralities of magnets are permanent magnets selected from the group consisting of a neodymium iron boron magnet, a bonded neodymium iron boron magnet, a samarium cobalt magnet, an alnico magnet, a ceramic (hard ferrite) magnet, and any combination thereof. Element 11: wherein the first magnetic ring is the rotating member and is coupled to a rotor shaft, the second magnetic ring is the stationary member and is coupled to a stator body, and the interference ring is the floating member. Element 12: wherein the first magnetic ring is the rotating member and coupled to a rotor shaft, the second magnetic ring is the floating member and coupled to a rotatable substrate, and the interference ring is the stationary member. Element 13: wherein the first magnetic ring is the stationary member and coupled to a stator that houses the plurality of coil windings, the second magnetic ring is the rotating member and is coupled to a rotatable substrate, and the interference ring is the floating member.

Element 14: wherein the portion of the direct drive electrical power generator comprises a rotor shaft, and wherein rotating the portion of the direct drive electrical power generator comprises rotating the rotor shaft as engaged with a stem extending from a wall of the cavity. Element 15: further comprising conveying the electrical power to one or more electricity-consuming devices with an electrical conductor that extends from the direct drive electrical power generator, wherein the one or more electricity-consuming devices are selected from the group consisting of a sensor controller, a temperature sensor, a pressure sensor, a gamma ray sensor, a resistivity sensor, a mud viscosity sensor, a seismic sensor, a strain sensor, an RPM sensor, a formation sensor, an electronics unit, a capacitor, a rectifier, a power storage device, a telemetry module, a battery, a rechargeable battery, and a toroid. Element 16: wherein conveying the electrical power to the one or more electricity-consuming devices comprises conveying the electrical power to the one or more electricity-consuming devices as positioned within at least one of the coupling, the support arm, and the roller cone. Element 17: wherein conveying the electrical power to the one or more electricity-consuming devices comprises conveying the electrical power to the one or more electricity-consuming devices as positioned within a drilling fluid cavity defined within the bit body. Element 18: wherein the drill bit further includes a lubricant chamber defined within the support arm, a lubricant conduit in fluid communication with the lubricant chamber and defined in the support arm, and a ball passageway in fluid communication with the lubricant conduit and defined in the coupling, the method further comprising extending the electrical conductor through at least the ball passageway, the lubricant conduit, and the lubricant chamber to reach the drilling fluid cavity. Element 19: wherein conveying the electrical power to the one or more electricity-consuming devices comprises conveying the electrical power to the one or more electricity-consuming devices as positioned within a near-bit sub coupled to the bit body at a threaded pin connection. Element 20: further comprising retrieving the drill bit to a surface location, and accessing the one or more electricity-consuming devices for at least one of servicing, rehabilitation, and replacement of the one or more electricity-consuming devices. Element 21: further comprising retrieving the drill bit to a surface location, disassembling the roller cone to access the direct drive electrical power generator, and removing the direct drive electrical power generator from the roller cone; and installing the direct drive electrical power generator in a secondary drill bit for use.

Element 22: wherein the first magnetic ring has a first plurality of magnets and the second magnetic ring has a second plurality of magnets, and wherein a number of the first plurality of magnets is different than a number of the second plurality of magnets. Element 23: wherein the interference ring includes a plurality of ferromagnetic pole pieces alternating with a plurality of spacers, the interference ring being configured to modulate magnetic fields exhibited by the first and second magnetic rings. Element 24: wherein the first magnetic ring is the rotating member and is coupled to the rotor shaft, the second magnetic ring is the stationary member and is coupled to a stator body, and the interference ring is the floating member. Element 25: wherein the rotor shaft is directly coupled to an inner wall of the cavity when the roller cone is mounted on the coupling. Element 26: further comprising a stem extending from a wall of the cavity, wherein the stem is engageable with the rotor shaft. Element 27: wherein an electrical conductor extends from the magnetic flux multiplier assembly to convey the electrical power to one or more electricity-consuming devices. Element 28: wherein the one or more electricity-consuming devices are selected from the group consisting of a sensor controller, a temperature sensor, a pressure sensor, a gamma ray sensor, a resistivity sensor, a mud viscosity sensor, a seismic sensor, a strain sensor, an RPM sensor, a formation sensor, an electronics unit, a capacitor, a rectifier, a power storage device, a telemetry module, a battery, a rechargeable battery, and a toroid. Element 29: wherein the one or more electricity-consuming devices are positioned within the cutter cone assembly. Element 30: wherein the one or more electricity-consuming devices are positioned within a drilling fluid cavity defined within the bit body. Element 31:

wherein the one or more electricity-consuming devices are positioned within a near-bit sub coupled to the bit body at a threaded pin connection.

By way of non-limiting example, exemplary combinations applicable to A, B, and C include: Element 3 with Element 4; Element 3 with Element 5; Element 3 with Element 6; Element 6 with Element 7; Element 3 with Element 8; Element 9 with Element 10; Element 9 with Element 11; Element 9 with Element 12; Element 9 with Element 13; Element 15 with Element 16; Element 15 with Element 17; Element 17 with Element 18; Element 15 with Element 19; Element 15 with Element 20; Element 27 with Element 28; Element 27 with Element 29; Element 27 with Element 30; and Element 27 with Element 31.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A drill bit, comprising:
a bit body defining at least one pocket;
a support arm attachable to the bit body at the at least one pocket and including a coupling that extends from the support arm;
a roller cone defining a cavity for receiving the coupling to rotatably mount the roller cone on the coupling; and
a direct drive electrical power generator positioned within the coupling and operatively coupled to the roller cone such that rotation of the roller cone correspondingly rotates a portion of the direct drive electrical power generator to generate electrical power, the direct drive electrical power generator comprising:
a stator body coupled to the bit body, the stator body housing a plurality of coil windings; and
a rotor shaft operatively coupled to the roller cone, wherein the stator body axially retains the rotor shaft within the stator body.

2. The drill bit of claim 1, wherein the direct drive electrical power generator is directly coupled to an inner wall of the cavity when the roller cone is mounted on the coupling.

3. The drill bit of claim 1, further comprising a stem extending from a wall of the cavity, wherein the stem is engageable with the rotor shaft of the direct drive electrical power generator.

4. The drill bit of claim 1, wherein an electrical conductor extends from the direct drive electrical power generator to convey the electrical power to one or more electricity-consuming devices.

5. The drill bit of claim 4, wherein the one or more electricity-consuming devices are selected from the group consisting of a sensor controller, a temperature sensor, a pressure sensor, a gamma ray sensor, a resistivity sensor, a mud viscosity sensor, a seismic sensor, a strain sensor, an RPM sensor, a formation sensor, an electronics unit, a capacitor, a rectifier, a power storage device, a battery, a rechargeable battery, a telemetry module, and a toroid.

6. The drill bit of claim 4, wherein the one or more electricity-consuming devices are positioned within at least one of the coupling, the support arm, and the roller cone.

7. The drill bit of claim 4, wherein the one or more electricity-consuming devices are positioned within a drilling fluid cavity defined within the bit body.

8. The drill bit of claim 4, wherein the one or more electricity-consuming devices are positioned within a near-bit sub coupled to the bit body at a threaded pin connection.

9. The drill bit of claim 1, wherein the direct drive electrical power generator is a magnetic flux multiplier assembly comprising:
a first magnetic ring having a first plurality of magnets;
a second magnetic ring having a second plurality of magnets, wherein a number of the first plurality of magnets is different than a number of the second plurality of magnets;
an interference ring that interposes the first and second magnetic rings and includes a plurality of ferromagnetic pole pieces alternating with a plurality of spacers, the interference ring being configured to modulate magnetic fields exhibited by the first and second magnetic rings; and wherein the plurality of coil windings are communicably coupled to one of the first and second magnetic rings and operable to conduct electrical power through interaction of the magnetic fields of the first and second magnetic rings, wherein the first and second magnetic rings and the interference ring are concentrically-located, and wherein, of the first and second magnetic rings and the interference ring, one is a rotating member, one is a floating member, and one is a stationary member, and wherein the rotating member is operatively coupled to the roller cone for rotation therewith.

10. The drill bit of claim 9, wherein the first magnetic ring is the rotating member and is coupled to the rotor shaft, the second magnetic ring is the stationary member and is coupled to the stator body, and the interference ring is the floating member.

11. The drill bit of claim 9, wherein the first magnetic ring is the rotating member and coupled to a rotor shaft, the second magnetic ring is the floating member and coupled to a rotatable substrate, and the interference ring is the stationary member.

12. The drill bit of claim 9 wherein the first magnetic ring is the stationary member and coupled to the stator that houses the plurality of coil windings, the second magnetic ring is the rotating member and is coupled to a rotatable substrate, and the interference ring is the floating member.

13. A method, comprising:
    introducing a drill string into a wellbore, the drill string having a drill bit positioned at a distal end thereof and the drill bit including a bit body defining at least one pocket, a support arm attachable to the bit body at the at least one pocket and including a coupling that extends from the support arm, the drill bit further including a roller cone that defines a cavity for receiving the coupling to rotatably mount the roller cone on the coupling;
    rotating the drill string within the wellbore and thereby rotating the roller cone on the coupling;
    rotating a portion of a direct drive electrical power generator positioned within the coupling as the roller cone rotates, the portion of the direct drive electrical power generator being operatively coupled to the roller cone, the direct drive electrical power generator comprising:
        a stator body coupled to the bit body, the stator body housing a plurality of coil windings; and
        a rotor shaft operatively coupled to the roller cone, wherein the stator body axially retains the rotor shaft within the stator body; and
    generating electrical power with the direct drive electrical power generator as the portion of the direct drive electrical power generator rotates.

14. The method of claim 13, wherein rotating the portion of the direct drive electrical power generator comprises rotating the rotor shaft as engaged with a stem extending from a wall of the cavity.

15. The method of claim 13, further comprising conveying the electrical power to one or more electricity-consuming devices with an electrical conductor that extends from the direct drive electrical power generator, wherein the one or more electricity-consuming devices are selected from the group consisting of a sensor controller, a temperature sensor, a pressure sensor, a gamma ray sensor, a resistivity sensor, a mud viscosity sensor, a seismic sensor, a strain sensor, an RPM sensor, a formation sensor, an electronics unit, a capacitor, a rectifier, a power storage device, a telemetry module, a battery, a rechargeable battery, and a toroid.

16. A rotary cone drill bit, comprising:
    a bit body defining at least one pocket;
    a cutter cone assembly attachable to the bit body at the at least one pocket and including a roller cone defining a cavity; and
    a magnetic flux multiplier assembly positioned within the cutter cone assembly and operatively coupled to a roller cone such that rotation of the roller cone correspondingly rotates a rotor shaft of the magnetic flux multiplier assembly to generate electrical power, the magnetic flux multiplier assembly comprising:
        a stator body coupled to the bit body, the stator body housing a plurality of coil windings, wherein the stator body axially retains the rotor shaft within the stator body,
    wherein the magnetic flux multiplier assembly includes a first magnetic ring, a second magnetic ring, an interference ring that interposes the first and second magnetic rings, and the plurality of coil windings are communicably coupled to one of the first and second magnetic rings, and
    wherein the first and second magnetic rings and the interference ring are concentrically-located and, of the first and second magnetic rings and the interference ring, one is a rotating member operatively coupled to the roller cone for rotation therewith, one is a floating member, and one is a stationary member.

17. The rotary cone drill bit of claim 16, wherein the first magnetic ring has a first plurality of magnets and the second magnetic ring has a second plurality of magnets, and wherein a number of the first plurality of magnets is different than a number of the second plurality of magnets.

18. The rotary cone drill bit of claim 16, wherein the interference ring includes a plurality of ferromagnetic pole pieces alternating with a plurality of spacers, the interference ring being configured to modulate magnetic fields exhibited by the first and second magnetic rings.

19. The rotary cone drill bit of claim 16, wherein the first magnetic ring is the rotating member and is coupled to the rotor shaft, the second magnetic ring is the stationary member and is coupled to the stator body, and the interference ring is the floating member.

20. The rotary cone drill bit of claim 16, wherein the rotor shaft is directly coupled to an inner wall of the cavity when the roller cone is mounted on the coupling.

21. The rotary cone drill bit of claim 16, further comprising a stem extending from a wall of the cavity, wherein the stem is engageable with the rotor shaft.

22. The rotary cone drill bit of claim 16, wherein an electrical conductor extends from the magnetic flux multiplier assembly to convey the electrical power to one or more electricity-consuming devices.

* * * * *